(12) United States Patent
Saad et al.

(10) Patent No.: US 11,403,258 B2
(45) Date of Patent: Aug. 2, 2022

(54) GENERATING HEXADECIMAL TREES TO COMPARE FILE SETS

(71) Applicant: EMC IP Holding Company LLC, Hopkinton, MA (US)

(72) Inventors: Yossef Saad, Ganei Tikva (IL); Itay Glick, Ramat Hasharon (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 161 days.

(21) Appl. No.: 16/984,611

(22) Filed: Aug. 4, 2020

(65) Prior Publication Data

US 2022/0043771 A1 Feb. 10, 2022

(51) Int. Cl.
*G06F 16/13* (2019.01)
*G06F 16/14* (2019.01)
*G06F 16/22* (2019.01)

(52) U.S. Cl.
CPC .......... *G06F 16/137* (2019.01); *G06F 16/152* (2019.01); *G06F 16/2246* (2019.01)

(58) Field of Classification Search
CPC ............. G06F 16/137; G06F 16/24578; G06F 16/152; G06F 16/2246; G06F 16/901
See application file for complete search history.

(56) References Cited

U.S. PATENT DOCUMENTS

| | | | |
|---|---|---|---|
| 9,149,054 B2* | 10/2015 | Manner | A23G 1/0066 |
| 2014/0297651 A1* | 10/2014 | Shadmon | G06F 16/2228 |
| | | | 707/741 |
| 2015/0234885 A1* | 8/2015 | Weinstein | G06F 16/152 |
| | | | 707/690 |

\* cited by examiner

*Primary Examiner* — Angelica Ruiz
(74) *Attorney, Agent, or Firm* — Staniford Tomita LLP

(57) ABSTRACT

First and second trees having leaves identified by hexadecimal values are generated. First files from a first file set are allocated across the first tree based on hashes of the first files. The hashes of the first files are translated into first leaf index values. Second files from a second file set are allocated across the second tree based on hashes of the second files. The hashes of the second files are translated into second leaf index values. The first and second leaf index values are compared to identify leaves that are the same between the first and second trees. A similarity index indicating a degree of similarity between the first and second sets of files is created based on the comparison.

18 Claims, 18 Drawing Sheets

GENERATING HEXADECIMAL TREES TO COMPARE FILE SETS

CROSS-REFERENCE TO RELATED APPLICATIONS

This application is related to co-pending U.S. patent application Ser. No. 16/984,545, filed Aug. 4, 2020, which is incorporated herein by reference for all purposes.

TECHNICAL FIELD

The present invention relates generally to the field of information management, and, more particularly, to comparing file sets.

BACKGROUND

File comparison utilities can be found in many software applications such as backup and replication systems. Many file comparison utilities operate by comparing files one-by-one. When, however, the file sets to compare contain hundreds of thousands if not millions of files, the file comparison operations can require an enormous amount of time and compute resources to complete. There is a need for improved systems and techniques to efficiently compare file sets, especially large file sets.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
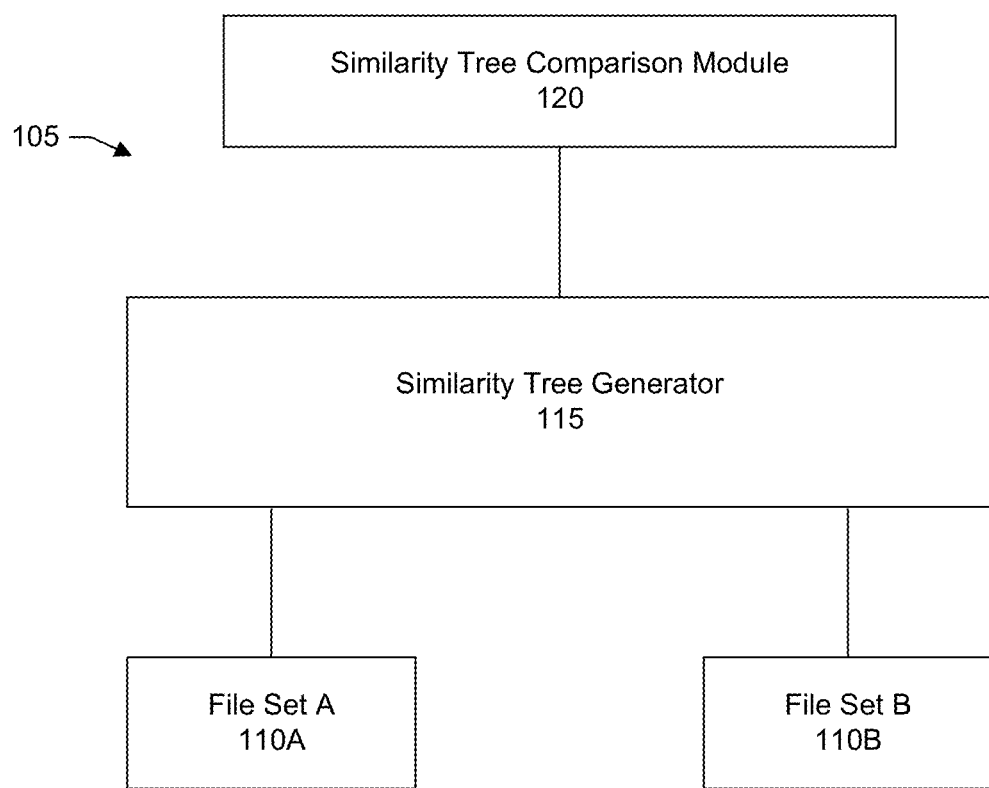
FIG. 1 shows a block diagram of system for comparing sets of files in accordance with one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

FIG. 1 shows a simplified block diagram of a system 105 for comparing two sets of files 110A, B quickly and efficiently. File comparison plays an important part in many application tasks such as file synchronization, data backup, replication, change management, version control, and so forth. As an example, consider that a data protection system includes a source host and a remote target host to which files at the source are backed up or replicated. It would be desirable to compare the files on the source and targets so that only files that are different are copied or replicated from the source to the target. There can be many hundreds of thousands or even millions of files to compare. Thus, it can take a significant amount of time and computing resources to perform the comparison. There is a need for improved systems and techniques for comparing sets of files, especially when a set contains a large number of files.

The system shown in FIG. 1 includes a similarity tree generator 115 and a similarity tree comparison module 120. The similarity tree generator is responsible for generating a tree or similarity tree for each particular file set. The similarity tree may be referred to as a hash tree or a hexadecimal tree and models a respective file set. A tree is a type of data structure in which data is organized hierarchically. The tree can include a set of hierarchical levels having entities where entities in a lower level branch from entities in an upper lever. In particularly, the tree can include a root at a top level of the tree and subtrees of children with a parent node, represented as a set of linked nodes. Nodes at a lowest level of the tree may be referred to as leaves.

The tree comparison module receives a first similarity tree corresponding to first file set 110A, a second similarity tree corresponding to second file set 110B, and compares the trees against each other to calculate a similarity index. The similarity index provides a measurement of a degree or level of similarity between the first and second similarity trees, and thus first and second file sets corresponding to the first and second similarity trees, respectively. In a specific embodiment, the similarity index is expressed as a percent value of files that are the same between the two sets of files. In a specific embodiment, the similarity index is used to facilitate an authentication of a backup client logging into a backup storage server. Further discussion is provided below.

Figure 2:
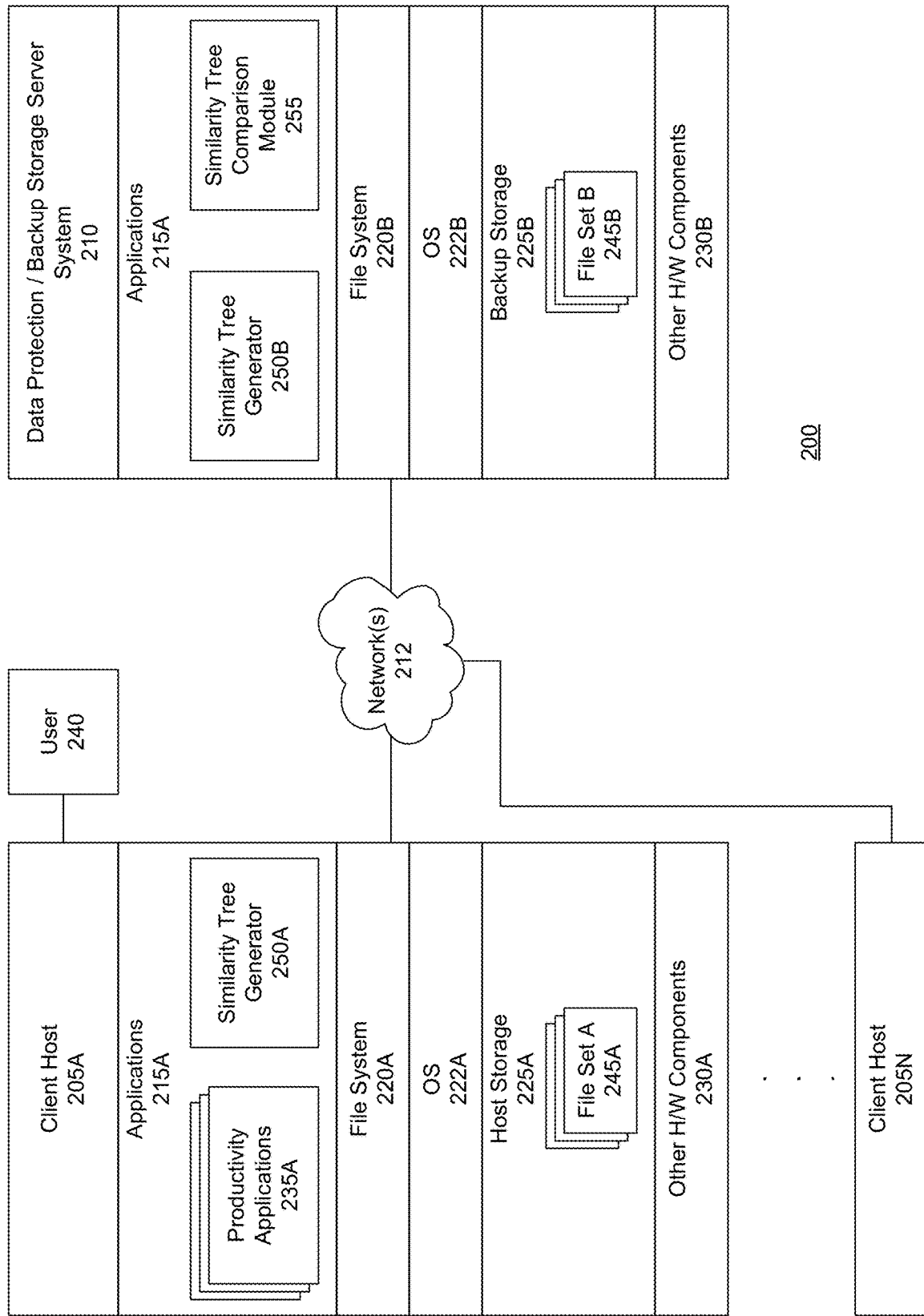
FIG. 2 shows a more detailed block diagram of a system for comparing sets of files in accordance with one or more embodiments.

FIG. 2 shows a more detailed block diagram of an information processing system 200 within which systems and techniques for comparing file sets may be provided according to one or more embodiments. In the example shown in FIG. 2, there are computer systems including client hosts 205A-N and data protection storage server 210. A network 212 connects the clients and server.

A computer system, such as client host 205A, may include a set of applications 215A, a file system 220A, operating system 222A, storage 225A, and other hardware components 230A (e.g., processor, memory, network interface card, and other interconnected hardware components). The applications may include productivity applications 235A. Some examples of productivity applications include word processing programs, spreadsheet programs, and presentation programs. A user 240 at the client host can use the productivity applications to create files 245A storing documents, presentations, worksheets, databases, charts, graphs, digital paintings, electronic music and digital video, or any other type of end user generated data.

These files may be organized by the file system and stored in storage 225A. The file system provides a way to organize data stored on the computer and present that data to the applications in a logical format. For example, the file system may organize the data into files and folders into which the files may be stored. The file system may provide a format for specifying a path to a file through the structure of folders. A file system may hold many hundreds of thousands or even many millions of files across many different folders and subfolders.

Files at the client may be backed up to the data protection or backup storage server and stored as file set or backup file set 245B. The server may likewise include a file system 220B in which file set 245B is organized, operating system 222B, storage 225B, and other hardware components 230B. The server may include a backup index that indexes the backup files according to various metadata. The server may store many different sets of backup files corresponding to each of the many different clients that the protection storage system supports and which have backed up their respective files to the backup server. The metadata of a backup index may include, for example, an identification of a particular client or backup source, time and date of a backup, names of files included in a backup, and other metadata.

If, for example, a file at a client was inadvertently deleted, became corrupted, or suffered some other data loss event, a backup of the file may be recovered by accessing the data protection or backup storage server, consulting the backup index, and then selecting the desired file (or set of files) to restore.

As discussed, it is desirable to be able to quickly and efficiently compare two sets of files. The comparison may be used to determine whether a backup or replication operation should be performed. In a specific embodiment, the comparison is used to facilitate authentication of a client seeking to log into a server.

In a specific embodiment, the client includes a similarity tree generator 250A. The server likewise includes a similarity tree generator 250B and a similarity tree comparison module 255. It should be appreciated that the components and modules shown in FIG. 2 may be functional and there can be many different hardware configurations, software configurations, or both to implement the functions described.

Similarity tree generator 250A is responsible for generating a first similarity tree corresponding to files in first file set A that are stored at the client and transmitting the first similarity tree from the client to the server. Similarity tree generator 250B is responsible for generating a second similarity tree corresponding to files in second file set B that are stored at the server, comparing the first and second trees, and calculating a similarity index indicating a degree of similarity between the two trees and thus the two respective sets of files.

Systems and techniques are provided to very quickly and efficiently generate a similarity tree for a particular file set even though there can be many hundreds of thousands or even millions of files in the file set. The similarity tree provides a compact and efficient representation or modeling of the files in the file set and thus requires very little bandwidth to transmit over a network. In a specific embodiment, the similarity trees enable comparing between two sets of files to understand, determine, or estimate how many files are similar between the two file sets. In this specific embodiment, the specific location of the file within the file set is not considered. In other words, the technique does not examine the specific location of the file. Instead, the determination is whether or not a particular file exists in the file set.

Figure 3:
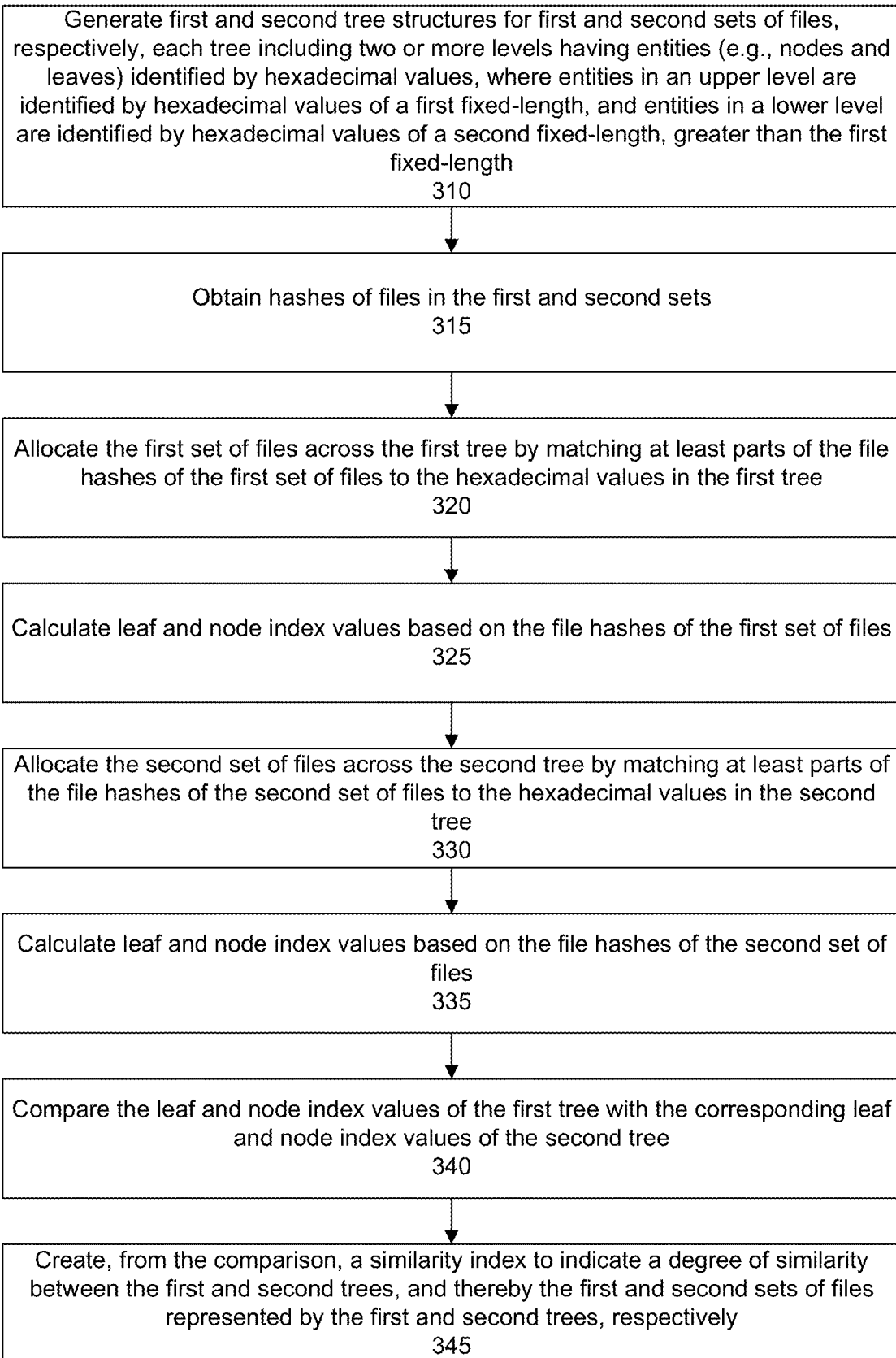
FIG. 3 shows an overall flow for comparing sets of files in accordance with one or more embodiments.

FIG. 3 shows an overall flow for efficiently comparing two sets of files according to one or more embodiments. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 310, first and second similarity tree structures are generated for first and second sets of files, respectively. Each tree includes two or more levels, arranged hierarchically, and includes entities in each level assigned or identified by hexadecimal values. Entities in an upper level are assigned or identified by hexadecimal values of a first fixed-length. Entities in a lower level, below the upper level, are assigned or identified by hexadecimal values of a second fixed-length, greater than the first fixed-length. Entities in a lowest level of the tree may be referred to as leaves. Entities in a level above the lowest level of the tree may be referred to as nodes.

Hexadecimal is a positional system that represents numbers using a base of 16. There are 16 possible digits or symbols used to represent numbers. In particular, symbols "0"-"9" represent values zero to nine and symbols "A"-"F" represent values ten to fifteen.

Figure 4:
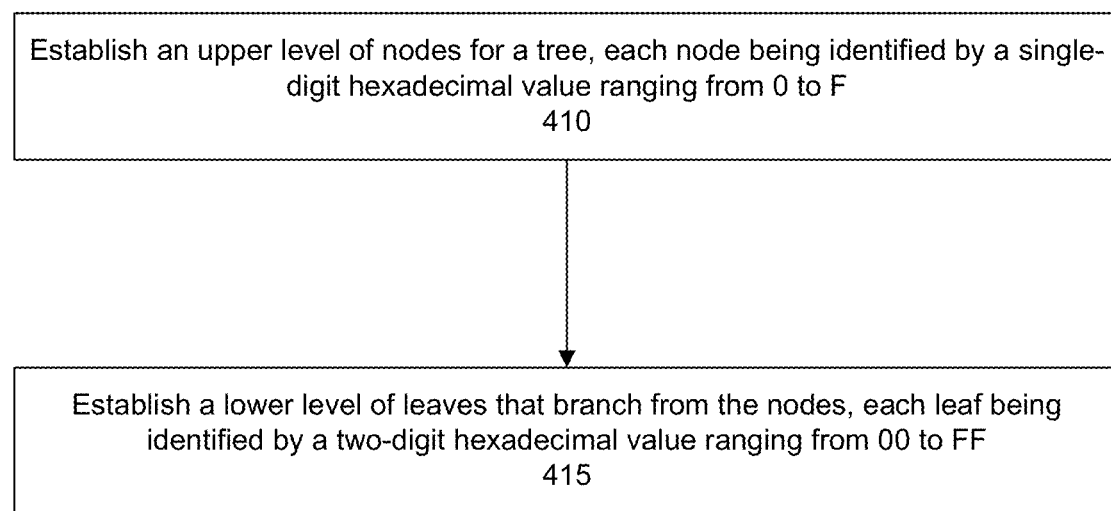
FIG. 4 shows a flow for building a similarity tree in accordance with one or more embodiments.

FIG. 4 shows further detail of a flow for generating a similarity tree. In this example, the tree has two-levels. In a step 410, an upper level of nodes is established for the tree. Each node in the upper level is assigned or identified by a single-digit hexadecimal value ranging from 0 to F. In a step 415, a lower level of leaves branching from the nodes is established. Each leaf is assigned or identified by a two-digit hexadecimal value ranging from 00 to FF.

Figure 5:
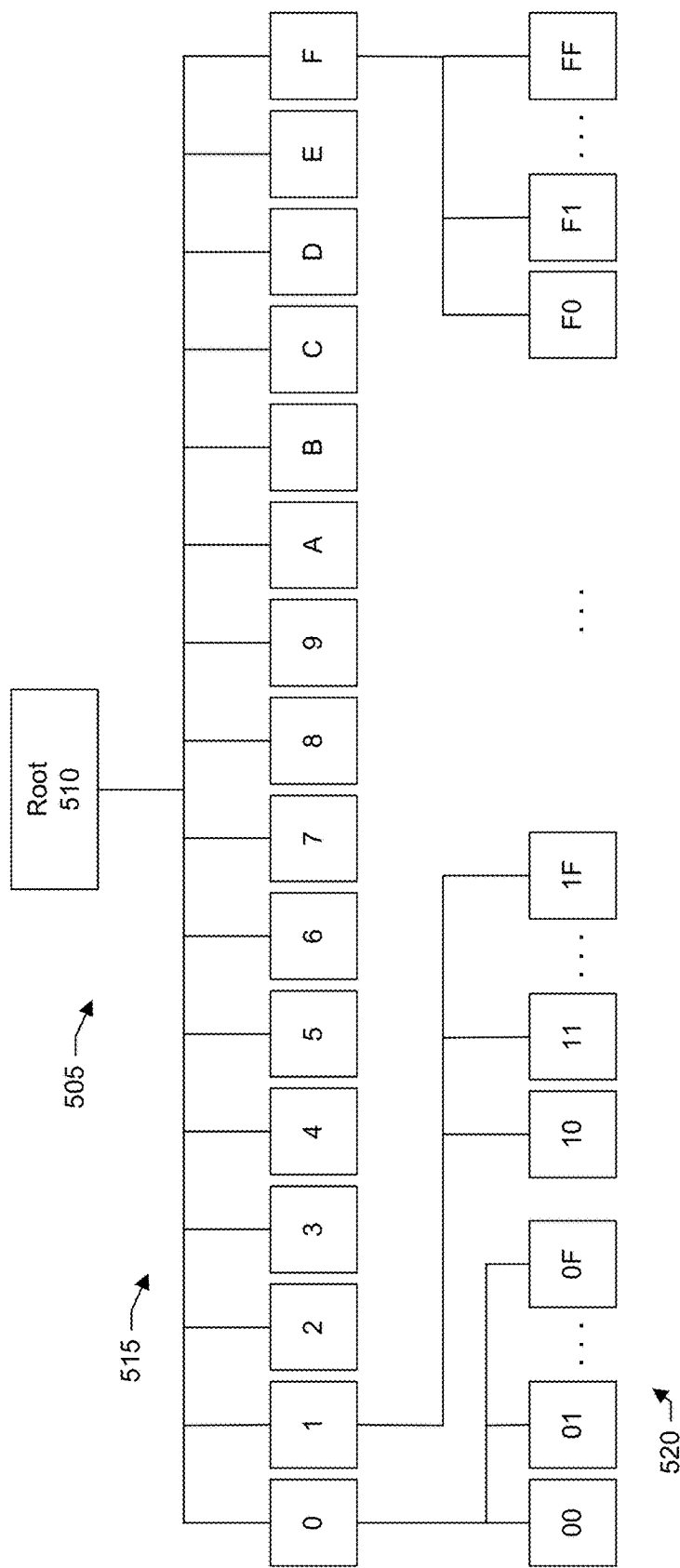
FIG. 5 shows an example of a similarity tree in accordance with one or more embodiments.

FIG. 5 shows a similarity tree 505 generated according to the flow shown in FIG. 4. This tree includes a root 510, an upper level of nodes 515, and a lower level of leaves 520 branching from the nodes. The upper of level of nodes have been assigned single-digit hexadecimal values ranging from 0 to F. The lower level leaves have been assigned two-digit hexadecimal values ranging from 00 to FF. The leaves are organized or arranged so that a hexadecimal digit in a first or initial position of a two-digit hexadecimal value of a leaf corresponds to a single-digit hexadecimal value of a node from which the leaf branches. Thus, each of the 16 unique nodes has 16 unique leaves branching from it. Thus, the tree includes a total of 256 leaves. For example, node 0 includes 16 leaves labeled 00, 01 . . . 0F. Node 1 includes 16 leaves labeled 10, 11 . . . 1F, and so forth.

Referring back now to FIG. 3, in a step 315 hash values are obtained or calculated for the files in the first and second sets of files. The trees may be built by calculating a hash for each file in each set of files. In a specific embodiment, a hash function is chosen or selected such that it is the same as a hash function used by the file system. This allows for obtaining or retrieving the file hashes from the file system catalog. Being able to use an existing set of file hashes eliminates the need to recalculate them, and thus conserves compute resources because the files will not have to be read to calculate new hashes. A hash is a one-way digest function. It takes a number of input bytes and computes a fixed-length value from it. Specifically, a hash function or algorithm is applied to content of a file to obtain a hash of the file. Any competent hash function may be used. In a specific embodiment, the hash function is a Secure Hash Algorithm (SHA-1). SHA-1 is a cryptographic hash function which takes an input and produces a 160-bit (20-byte) hash value or string of hexadecimal digits.

Figure 6:
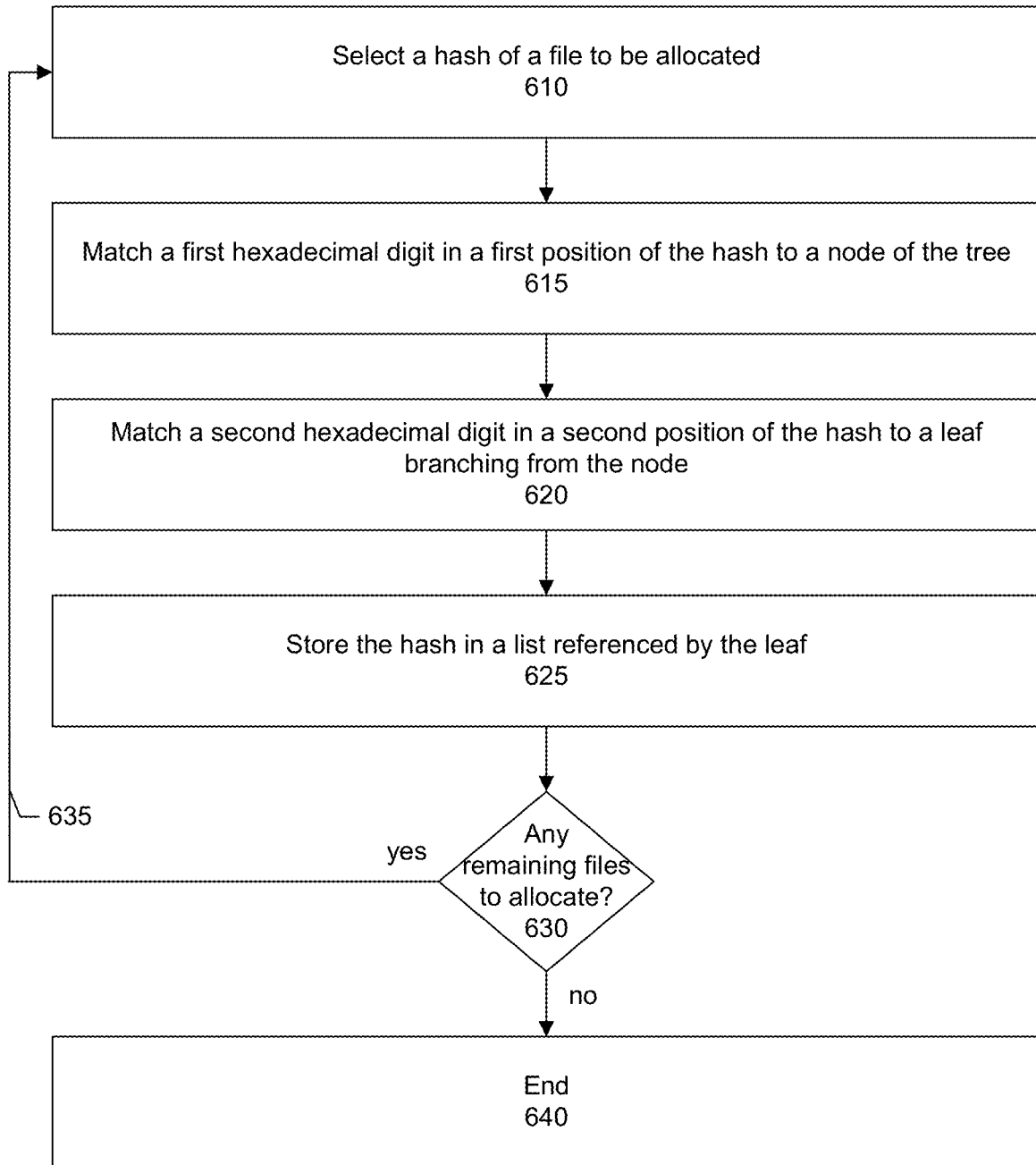
FIG. 6 shows a flow for allocating files in a file set across a similarity tree in accordance with one or more embodiments.

In a step 320, the first set of files are allocated or distributed across the first tree by matching at least parts of the file hashes of the first set of files to the hexadecimal values in the first tree. FIG. 6 shows further detail of a flow for allocating files according to their hash values. In a step 610, a hash of a file to be allocated is selected. In a step 615, a first hexadecimal digit in a first position of the hash is matched to a node of the tree. In a step 620, a second hexadecimal digit in a second position of the hash is matched to a leaf branching from the node. In a step 625, the hash is stored in a list referenced by the leaf.

The process continues until all files have been allocated to the tree via their hashes. In other words, in a step 630, a determination is made as to whether there are any remaining files in a file set to allocate. If so, the process loops back 635 to step 610 in which another hash of another file is selected and matched to the appropriate node and downstream leaf. Once all files in the file set have been allocated or distributed across the tree, the process ends (step 640).

As an example, consider that the first file set includes six files to allocate. A hash function is applied to the content of each file. Table A below shows the file hash values that have been calculated. For purposes of clarity, only the first four digits of the hash values are shown.

TABLE A

| File | File Hash |
| --- | --- |
| File 1 | 00C3 . . . |
| File 2 | 00FB . . . |
| File 3 | 11A8 . . . |
| File 4 | 115F . . . |
| File 5 | 11DA . . . |
| File 6 | F09C . . . |

Figure 7:
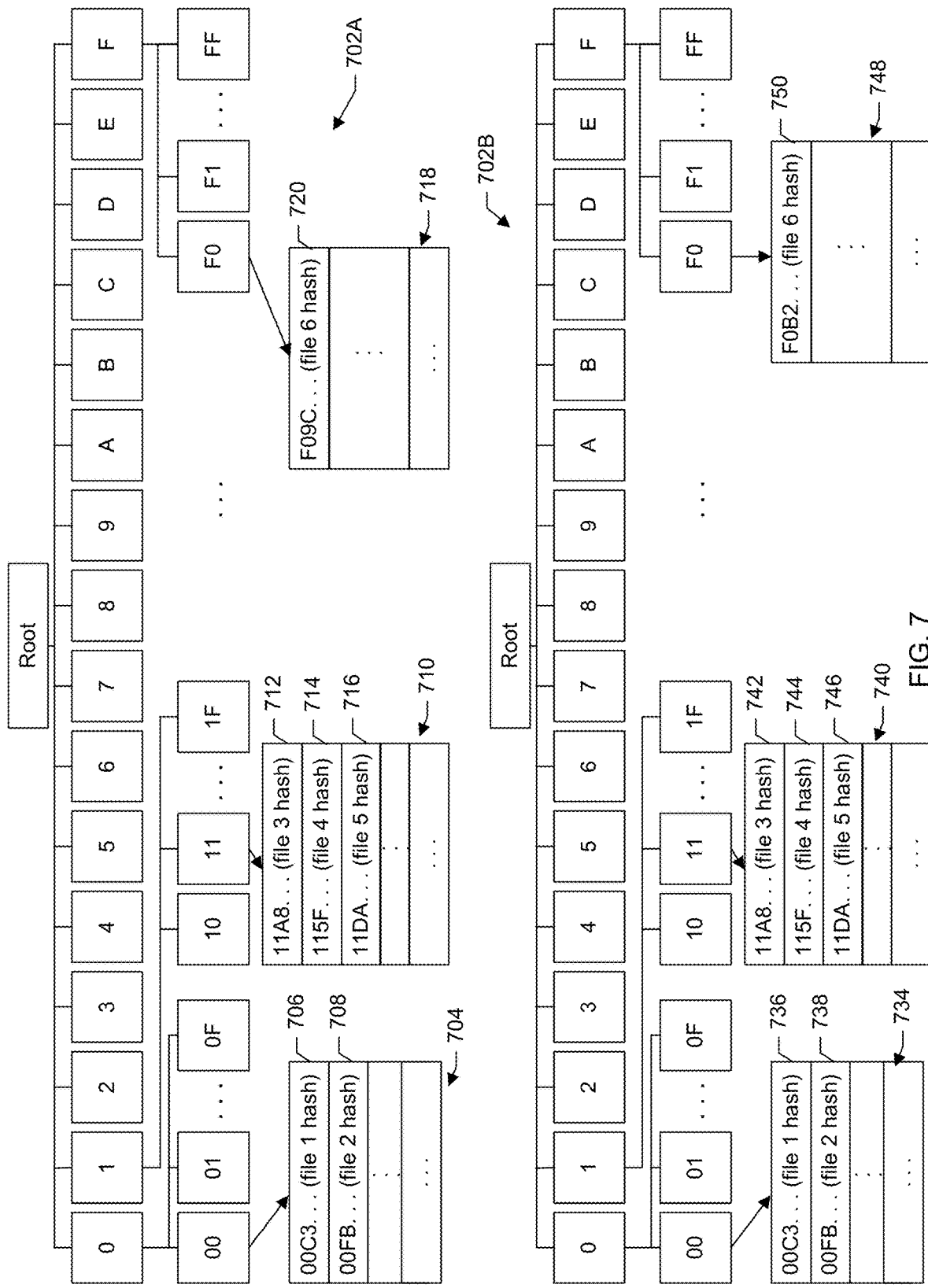
FIG. 7 shows first and second similarity trees for first and second file sets, respectively, in accordance with one or more embodiments.

FIG. 7 shows a first similarity tree 702A in which files from the first file set have been allocated according to the file hash values in table A. In a specific embodiment, a leaf includes a pointer to a list of entries containing the hashes of files that have been matched to the leaf. For example, a leaf having two-digit hexadecimal value 00 branching from a node having single-digit hexadecimal value 0 points to a list 704. List 704 includes entries 706 and 708. Entry 706 stores file hash "00C3 . . . " corresponding to a hash of file 1 from the first set of files. Entry 708 stores file hash "00FB . . . " corresponding to a hash of file 2 from the first set of files.

A leaf having two-digit hexadecimal value 11 branching from a node having single-digit hexadecimal value 1 points to a list 710. List 710 includes entries 712, 714, and 716. Entry 712 stores file hash "11A8 . . . " corresponding to a hash of file 3 from the first set of files. Entry 714 stores file hash "115F . . . " corresponding to a hash of file 4 from the first set of files. Entry 716 stores file hash "11DA . . . " corresponding to a hash of file 5 from the first set of files.

A leaf having two-digit hexadecimal value F0 branching from a node having single-digit hexadecimal value F points to a list 718. List 718 includes an entry 720. Entry 720 stores file hash "F09C . . . " corresponding to a hash of file 6 from the first set of files.

Referring back now to FIG. 3, in a step 325, leaf index values are calculated for the leaves based on the listings of file hashes referenced by the leaves; and node index values are calculated based on the leaf index values. In a specific embodiment, the tree is traversed and a leaf index value of a leaf is calculated by applying an exclusive OR (XOR) function to the file hashes referenced by the leaf. The function translates multiple hash values into a single string.

Figure 8:
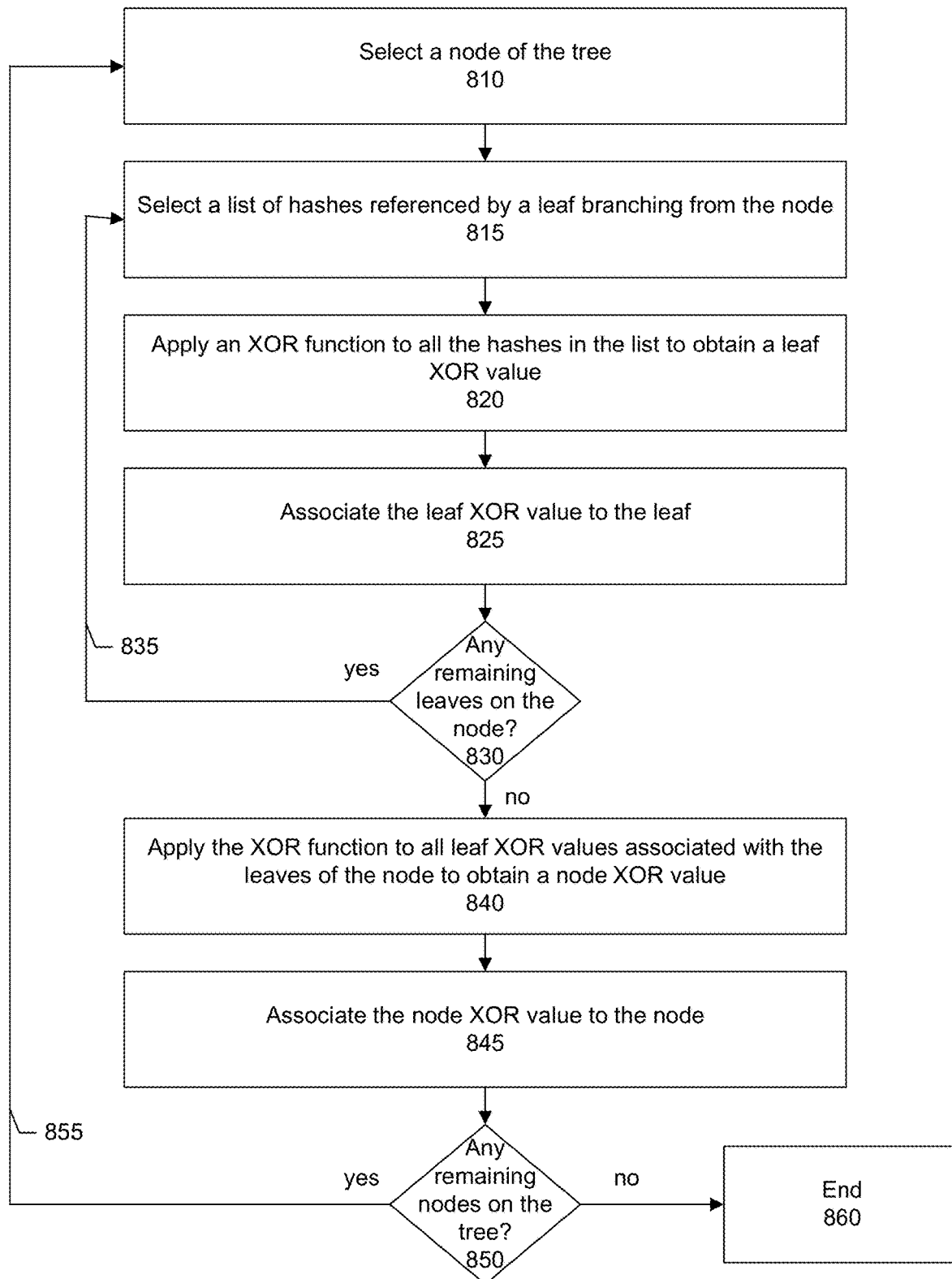
FIG. 8 shows a flow for calculating leaf and node index values for the similarity trees in accordance with one or more embodiments.

FIG. 8 shows further detail of a flow for calculating leaf index values according to one or more embodiments. In a step 810, a node of the tree is selected. In a step 815, a listing of file hashes referenced by a leaf branching from the node is selected. In a step 820, an XOR function is applied to the file hashes in the listing to obtain a leaf XOR value or result. The leaf XOR result may be referred to as a leaf index value. In a step 825, the leaf XOR value is associated to the leaf. The leaf XOR calculation is repeated for each remaining leaf branching from the node of the tree.

For example, in a step 830, a determination is made as to whether there are any remaining leaves on the node. If so, the process loops back 835 to step 815 in which another listing of file hashes referenced by another leaf branching from the node is selected. The XOR function is again applied to obtain another leaf XOR result which is then assigned to the other leaf. Thus, each leaf carries a value that is the XOR of all the file hashes in its list.

In a step 840, once the leaf XOR values or results have been calculated for each leaf of the node, the XOR function is applied to all leaf XOR values associated with the leaves of the node to calculate a node XOR result. The node XOR result may be referred to as a node index value. In a step 845, the node XOR result is associated to the node.

The node XOR (and associated leaf XOR) calculations are repeated for each remaining node of the tree. For example, in a step 850, a determination is made as to whether there are any remaining nodes of the tree. If so, the process loops back 855 to step 810 in which another node is selected and the XOR calculations repeated. Thus, each node carries a value that is the XOR of all the leaves or downstream nodes connected to it.

Figure 9:
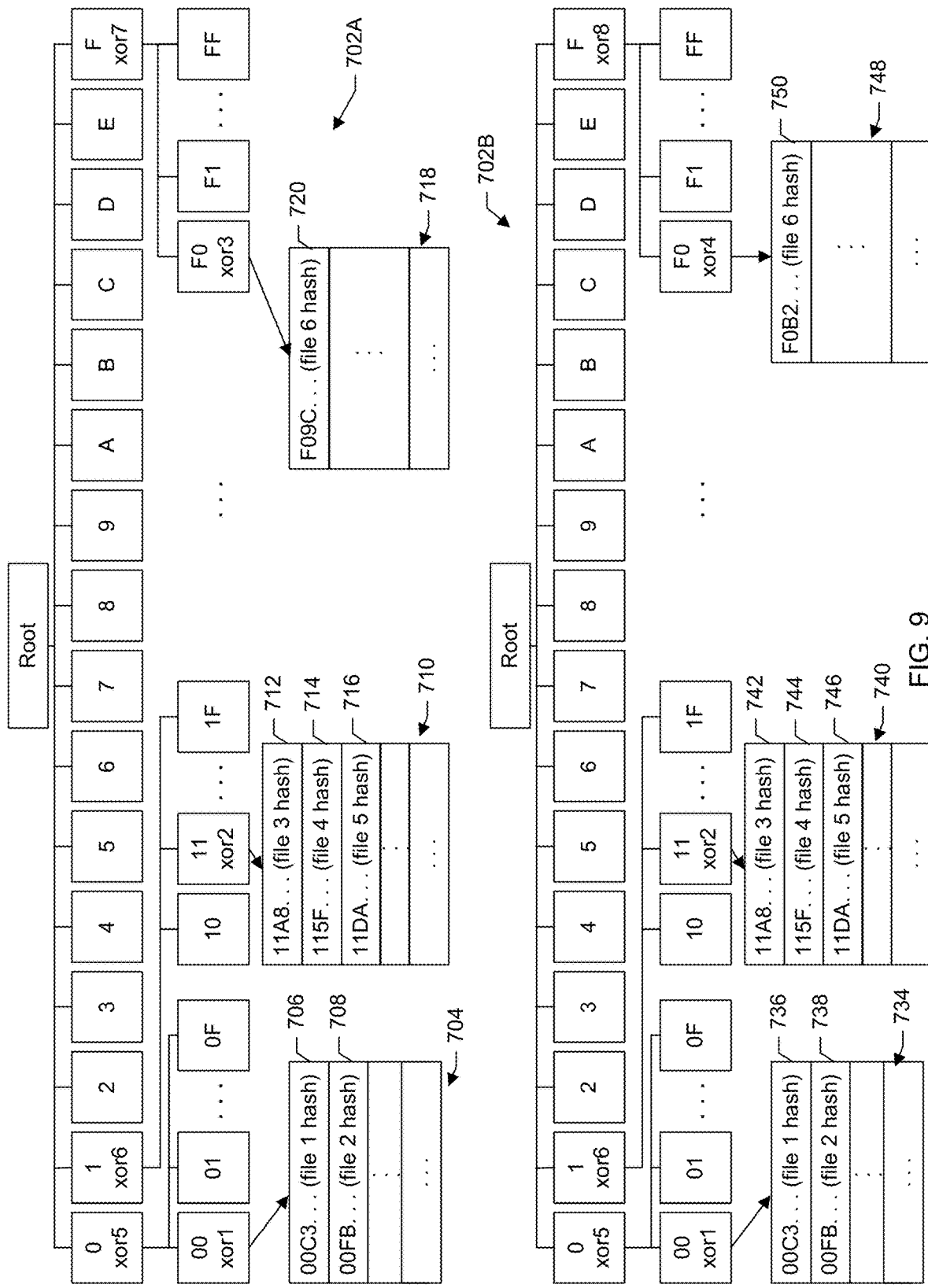
FIG. 9 shows first and second similarity trees with leaf and node index values in accordance with one or more embodiments.

FIG. 9 shows first similarity tree 702A from FIG. 7 in which the first tree has been updated with the leaf and node XOR results. For example, leaf 00 is associated with a leaf XOR value XOR1. XOR1 for leaf 00 is calculated by applying an XOR function to file hashes stored in hash list 704. Leaf 11 is associated with a leaf XOR value XOR2. XOR2 for leaf 11 is calculated by applying an XOR function to file hashes stored in hash list 710. Leaf F0 is associated with a leaf XOR value XOR3. XOR3 for leaf F0 is calculated by applying an XOR function to file hashes stored in hash list 718.

Node 0 is associated with a node XOR value XOR5. XOR5 for node 0 is calculated by applying an XOR function to the leaf XOR values of the leaves downstream from node 0 (e.g., leaves 00-0F). Node 1 is associated with a node XOR value XOR6. XOR6 for node 1 is calculated by applying an XOR function to the leaf XOR values of the leaves downstream from node 1 (e.g., leaves 10-1F), and so forth. For example, node F is associated with a node XOR value XOR7. XOR7 for node F is calculated by applying an XOR function to the leaf XOR values of the leaves downstream from node F (e.g., leaves F0-FF). Thus, an XOR value of a specific entity (e.g., node or leaf) in a tree can represent a rollup or "sum" of all other values associated with other entities downstream from the specific entity. If there is a change in another entity downstream from the specific entity, the XOR value of the specific entity will also change.

The XOR operation is a function $f(x1, x2, \ldots xn)$ that translates multiple hashes into one string of the same length, and also includes the attribute that enables adding/removing an item without recalculating the function on all the items (which could be a large number of file hashes). This is in case a file is added or removed.

Mathematically, it is desired to have an associative function that maintains the following:

$$f(x,x)=0$$

$$f(x,0)=x$$

XOR fits the above requirement and is very simple to calculate. It should be appreciated, however, that a different function that complies with the above may instead be used.

For example, consider three file hashes: x1, x2, x3:

a) The leaf value L3 will be: L3=f(x1, x2, x3)

b) Now assume a file with hash x4 is added, the new leaf value can be calculated using the previous value (no need to recalculate it with the first files): L4=f(L3, x4)

c) Now file x2 is deleted, so to remove it from the leaf value and to calculate the new value L'3, the operation is merely: L'3=f(L4, x2)

With XOR, the above is as follows:

a) L3=x1 xor x2 xor x3 b) L4=L3 xor x4 c) L'3=L4 xor x2

Referring back now to FIG. 3, in a step 330, the second set of files are allocated or distributed across the second tree by matching at least parts of the file hashes of the second set of files to the hexadecimal values in the second tree. The allocation of the files in the second file set is similar to the allocation of the files in the first file set (see, e.g., step 320, FIG. 6, and discussion accompanying step 320 and FIG. 6).

As an example, consider that the second file set includes six files to allocate. A hash function is applied to the content of each file. Table B below shows the file hash values that have been calculated. Again, for purposes of clarity, only the first four digits of the hash values are shown.

TABLE B

| File | File Hash |
| --- | --- |
| File 1 | 00C3 . . . |
| File 2 | 00FB . . . |
| File 3 | 11A8 . . . |
| File 4 | 115F . . . |
| File 5 | 11DA . . . |
| File 6 | F0B2 . . . |

FIG. 7 shows a second similarity tree 702B in which files from the second file set have been allocated according to the file hash values shown in table B. As discussed, in a specific embodiment, a leaf includes a pointer to a list of entries containing hashes of files that have been matched to the leaf. For example, in the second tree, a leaf having two-digit hexadecimal value 00 branching from a node having single digit hexadecimal value 0 points to a list 734. List 734 includes entries 736 and 738. Entry 736 stores file hash "00C3 . . . " corresponding to a hash of file 1 from the second set of files. Entry 738 stores file hash "00FB . . . " corresponding to a hash of file 2 from the second set of files.

In the second tree, a leaf having two-digit hexadecimal value 11 branching from a node having single-digit hexadecimal value 1 points to a list 740. List 740 includes entries 742, 744, and 746. Entry 742 stores file hash "11A8 . . . " corresponding to a hash of file 3 from the second set of files. Entry 744 stores file hash "115F . . . " corresponding to a hash of file 4 from the second set of files. Entry 746 stores file hash "11DA . . . " corresponding to a hash of file 5 from the second set of files.

In the second tree, a leaf having two-digit hexadecimal value F0 branching from a node having single-digit hexadecimal value F points to a list 748. List 748 includes an entry 750. Entry 750 stores file hash "F0B2 . . . " corresponding to a hash of file 6 from the second set of files.

Referring back now to FIG. 3, in a step 335 for the second tree, leaf index values are calculated for the leaves based on the listings of file hashes referenced by the leaves; and node index values are calculated based on the leaf index values. The calculation of leaf and node index values for the second tree is similar to the calculation of leaf and node index values for the first tree (see, e.g., step 325, FIG. 8, and discussion accompanying step 325 and FIG. 8).

FIG. 9 shows second similarity tree 702B from FIG. 7 in which the second tree has been updated with the leaf and node XOR values or results. For example, in the second tree, leaf 00 is associated with a leaf XOR value XOR1. XOR1 for leaf 00 is calculated by applying an XOR function to file hashes stored in hash list 734. Leaf 11 is associated with a leaf XOR value XOR2. XOR2 for leaf 11 is calculated by applying an XOR function to file hashes stored in hash list 740. Leaf F0 is associated with a leaf XOR value XOR4. XOR4 for leaf F0 is calculated by applying an XOR function to file hashes stored in hash list 748.

In the second tree, node 0 is associated with a node XOR value XOR5. XOR5 for node 0 is calculated by applying an XOR function to the leaf XOR values of the leaves downstream from node 0 (e.g., leaves 00-0F). Node 1 is associated with a node XOR value XOR6. XOR6 for node 1 is calculated by applying an XOR function to the leaf XOR values of the leaves downstream from node 1 (e.g., leaves 10-1F). Node F is associated with a node XOR value XOR8. XOR8 for node F is calculated by applying an XOR function to the leaf XOR values of the leaves downstream from node F (e.g., leaves F0-FF).

Referring back now to FIG. 3, in a step 340, the leaf and node index values (e.g., leaf and node XOR values) of the first tree are compared with the corresponding leaf and node index values of the second tree. In a step 345, based on the comparison, a similarity index is calculated to indicate a degree of similarity between the first and second trees, and thereby the first and second sets of files as represented by the first and second trees, respectively. As discussed, in a specific embodiment, the similarity index is expressed as a percentage of leaves that are the same between the first and second trees.

Figure 10:
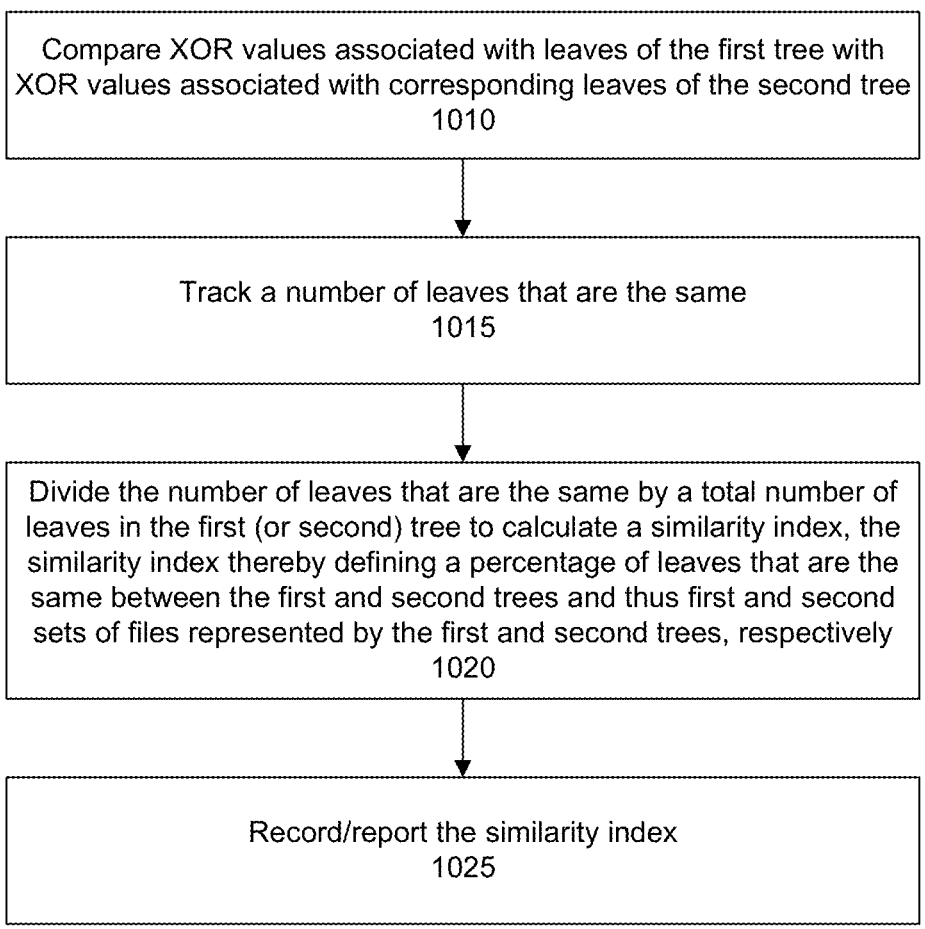
FIG. 10 shows a flow for calculating a similarity index in accordance with one or more embodiments.

FIG. 10 shows a flow for the similarity index calculation according to one or more embodiments. In brief, in a step 1010, XOR values associated with leaves of the first tree are compared with XOR values associated with corresponding leaves of the second tree. In a step 1015, a number of leaves having the same XOR values are tracked. In a step 1020, the number of leaves that are the same are divided by a total number of leaves in the first (or second) tree. The quotient may be multiplied by 100 to convert the decimal form of the result to a percentage value. Thus, in this specific embodiment, the similarity index defines a percentage of leaves that are the same between the first and second trees, and thus first and second sets of files represented by the first and second trees, respectively. In a step 1025, the similarity index is recorded or reported.

As an example, consider a comparison of the first and second similarity trees shown in FIG. 9. Leaf 00 of the first tree has an XOR value of XOR1. Corresponding leaf 00 of the second tree has an XOR value of XOR1. Thus, these leaves are the same. Leaf 11 of the first tree has an XOR value of XOR2. Corresponding leaf 00 of the second tree has an XOR value of XOR2. Thus, these leaves are the same. Leaf F0 of the first tree has an XOR value of XOR3. Corresponding leaf 00 of the second tree has an XOR value of XOR4. Thus, these leaves are different. For purposes of example, consider that all other remaining leaves between the two trees are the same. That is, there are 255 leaves that are the same and one leaf that is different (e.g., leaf F0). In this example, the similarity index is 99.6 percent (%), i.e., 255 divided by 256 equals 99.6 percent.

Figure 11:
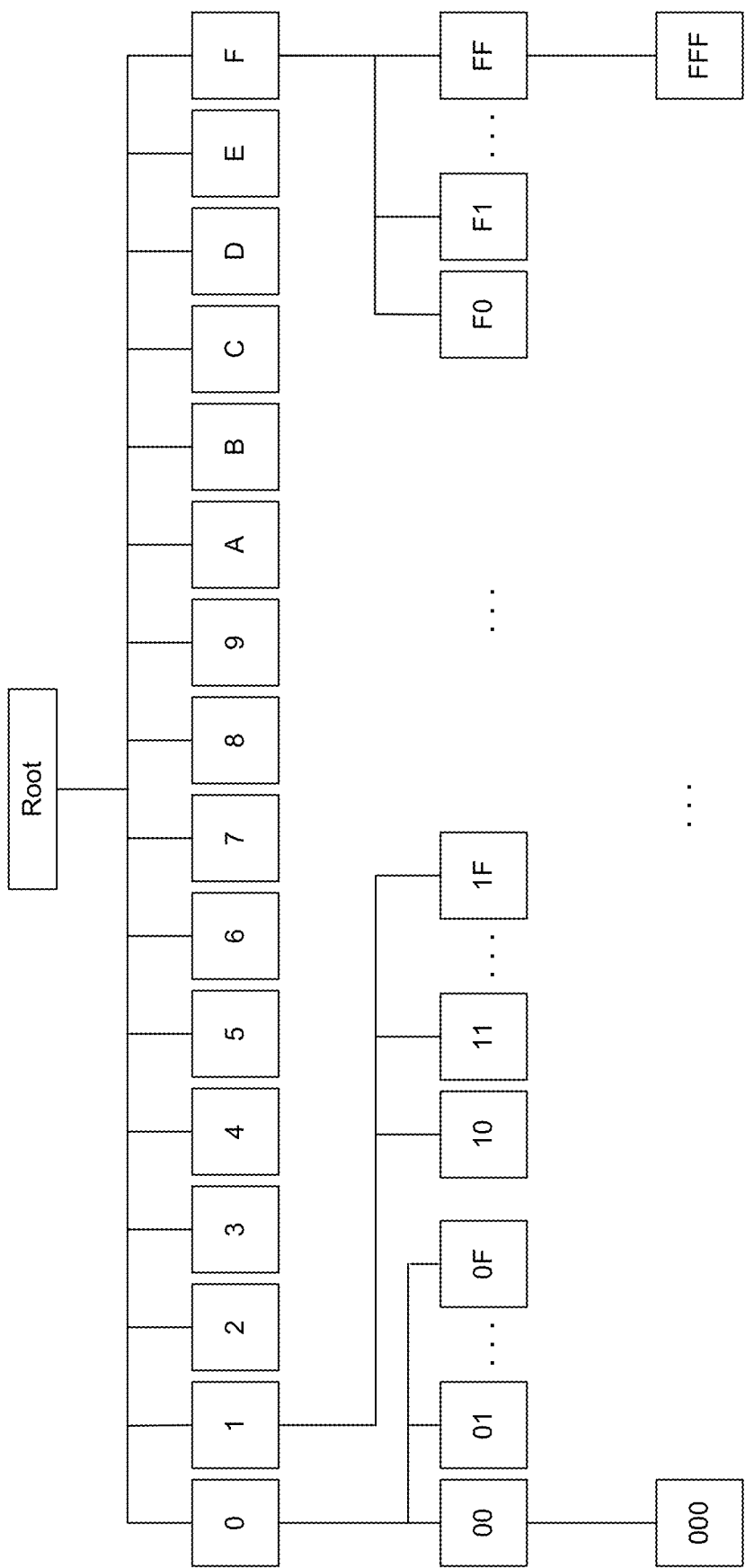
FIG. 11 shows an example of a 3-level similarity tree in accordance with one or more embodiments.

The similarity trees shown in the example of FIG. 9 are two-level trees. It should be appreciated, however, that a tree having a greater number of levels may instead be used. For example, FIG. 11 shows an example of a three-level tree. In a three-level tree, entities (e.g., nodes) in a first or uppermost level are assigned single-digit hexadecimal values ranging from 0 to F. Entities (e.g., nodes) in a second level immediately below the first level are assigned two-digit hexadecimal values ranging from 00 to FF. Entities (e.g., leaves) in a third level immediately below the second level are assigned three-digit hexadecimal values ranging from 000 to FFF. Thus, a three-level tree allows for 4096 leaves or, more particularly, 4096 pointers to 4096 file hash lists. The three-level tree can provide a greater degree of resolution or accuracy as compared to a two-level tree. However, a size of the three-level tree may be greater than a size of the two-level tree. In a specific embodiment, a number of levels to establish for the trees can be configurable such as by an administrator. This allows each organization to tailor the system to their particular needs.

Figure 12:
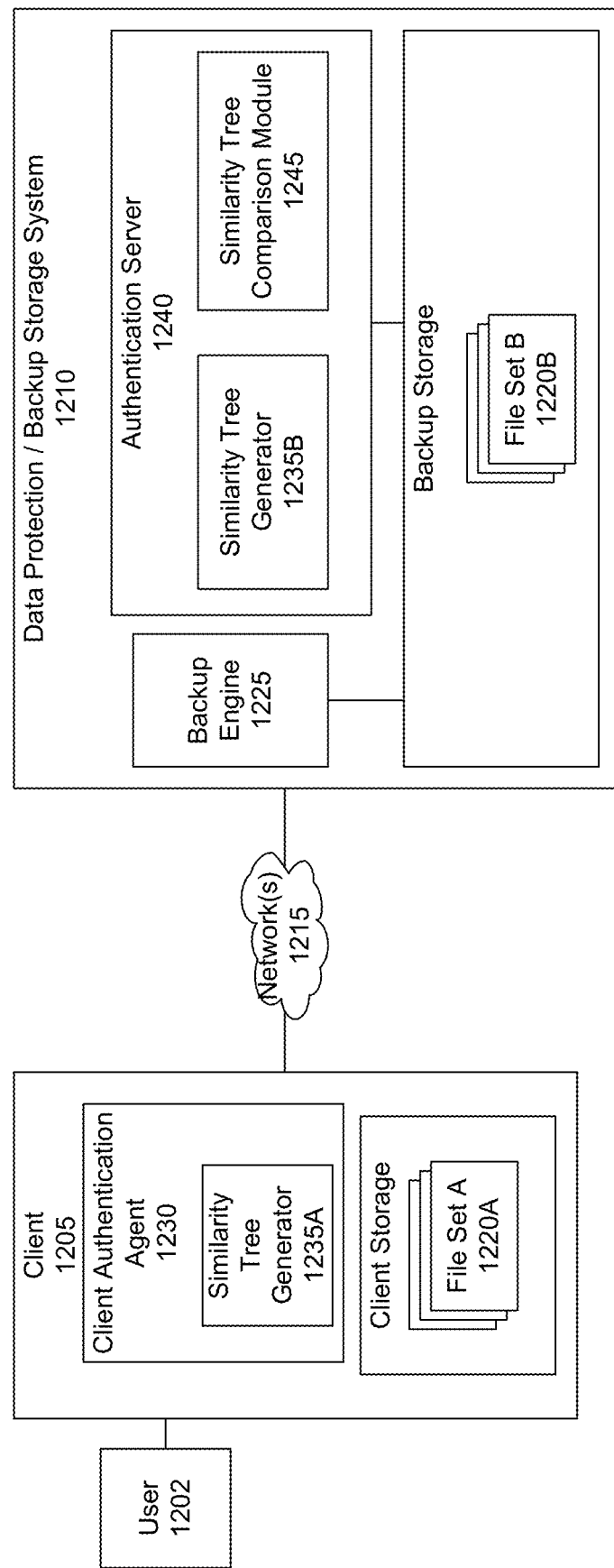
FIG. 12 shows a block diagram for multi-factor authentication based on data (DFA) in accordance with one or more embodiments.

FIG. 12 shows a block diagram of a mechanism for multi-factor authentication based on data (DFA). In this specific embodiment, systems and techniques are provided for authentication based on a calculation of a similarity index. The example shown in FIG. 12 includes a user 1202 at a client device 1205, a data protection or backup storage system 1210, and a network 1215 connecting the client and backup storage server. The client includes a first set of files 1220A, at least some of which have been (presumably) backed up to the backup system by a backup engine 1225 and stored as a second or backup set of files 1220B. The client further includes a client authentication agent 1230 having a similarity tree generator 1235A. The backup storage system includes an authentication server 1240. The authentication server includes a similarity tree generator 1235B and similarity tree comparison module 1245.

The authentication agent and authentication server coordinate with each other to authenticate an attempt by the user to access the second or backup set of files 1220B stored at the backup server. More particularly, during the access attempt, the tree generator at the client generates a first similarity tree based on the first file set at the client. The first similarity tree is transmitted from the client to the backup storage system along with other credentials the user may have inputted at the client (e.g., username and password). The tree generator at the backup storage system generates a second similarity tree based on the second file set at the backup storage system.

The tree comparison module at the authentication server of the backup storage system compares the first and second similarity trees to calculate a similarity index. The authentication server compares the similarity index to a threshold similarity. If the similarity index is below the threshold similarity, the user is denied access even if the other user-inputted credentials have been validated as authentic. If the similarity index is above the threshold similarity and the other user-inputted credentials are validated as authentic, the user is permitted access.

Presumably, in a case of a legitimate access attempt, files in the second file set are backups of the files in the first file set at the client and the user has been conducting regular backups of the client. With regular backups and in the case of a legitimate access attempt, there are likely to be relatively few file changes of differences between the first and second sets of files. Adding data similarity between the client and backup storage server as a factor in authentication helps to further secure the backup storage system from unauthorized access. Further, because a similarity tree may be generated automatically and is relatively small in size, the user experience is not adversely affected.

More particularly, when users back up their computers (desktops/laptops) on a backup service, whether on-premises or to the cloud (BaaS), accessing the data requires authentication to ensure that the right user is accessing the data. This is typically done by using a password to the backup account/system, which in case of a client device is typically stored in the machine either within the backup client application or stored in the browser. However, using just a password is insufficient since a common method for attacks to retrieve data is by manipulating users to share the password using methods such as social engineering or phishing.

Figure 13:
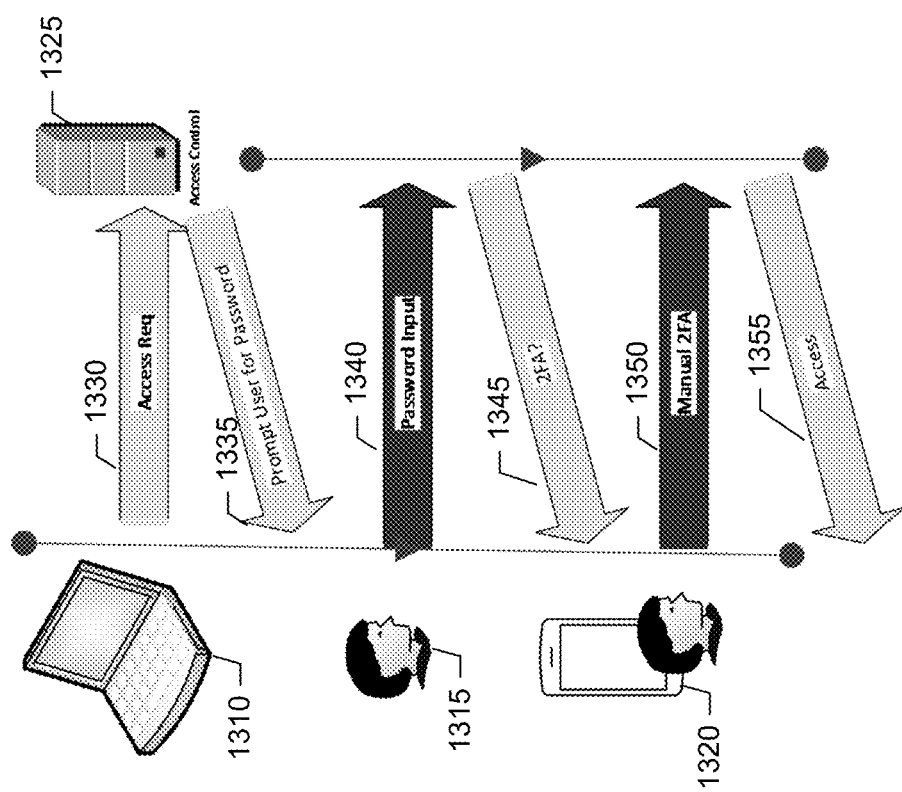
FIG. 13 shows a swimlane for authentication in accordance with one or more embodiments.

Yet there is a tradeoff between accessibility and security. Enforcing more security controls and password mechanisms such as SecureID token, whether it is in a computer, mobile or app, for 2 factor authentication (2FA), creates an additional layer of security, but interferes with the work and usability. For example, FIG. 13 shows a swimlane diagram for a typical 2 factor authentication. A first side of the swimlane includes a client (e.g., laptop) 1310, a user 1315, and a security token 1320 in a form of a mobile device (e.g., smartphone) registered or belonging to the user. A second side of the swimlane, opposite the first side, includes an access control server 1325. The authentication flow shown in FIG. 13 requires the user to perform two manual activities (password entry plus SecureID or another 2FA process such as a text message code).

Specifically, in a first flow 1330, there is an access request from the client to the access control server. In a second flow 1335, the access control server responds with a prompt for the user to input their password. In a third flow 1340, the user inputs their password. For example, the user may use a keyboard or other input device of the client to type in their password. The input of the password may be considered a first manual activity that the user must perform as part of a first authentication factor. Assuming the user's password is valid, in a fourth flow 1345, the access control server transmits a temporary one-time passcode to the user's mobile device such as via a text message. In a fifth flow 1350, the user inputs the one-time passcode to send the one-time passcode to the access control server. The input of the one-time passcode may be considered as a second manual activity that the user much perform as part of a second authentication factor. In a sixth flow 1355, if the one-time passcode is valid, the user is permitted by the access control server to access their account.

Thus, in a 2 factor authentication, a user must provide two types of identification in order to access their account. The requirement to enter both the password and the one-time passcode helps to better secure the account as compared to requiring only a username/password. For example, even if the user's password is compromised, a thief or other illegitimate user will not be able to access the account without having access to the user's mobile device. As discussed above, however, the additional manual step with entering the one-time passcode can be burdensome and degrades the user experience.

Figure 14:
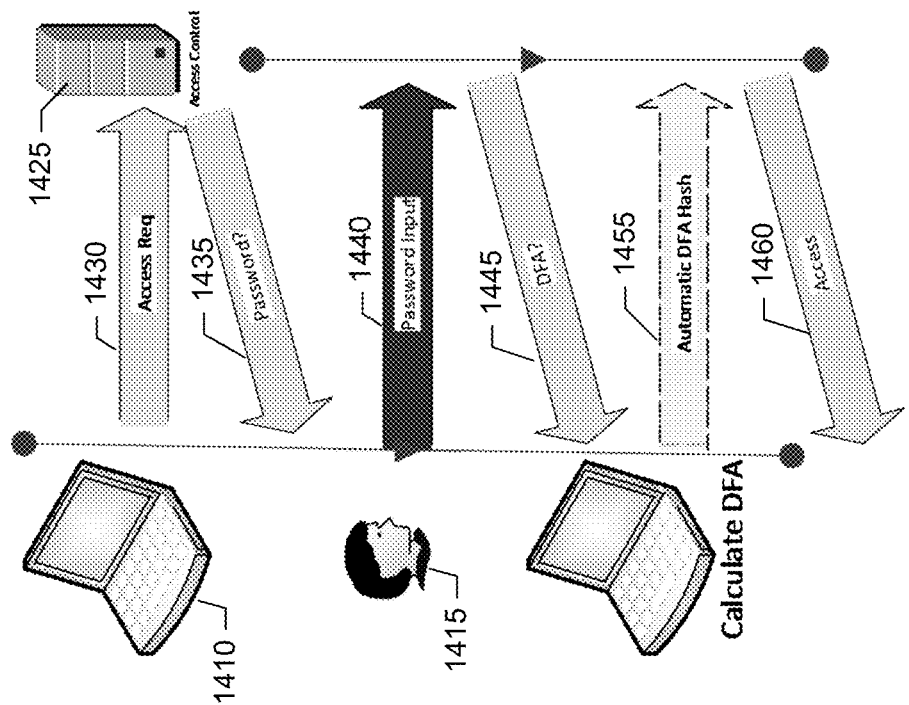
FIG. 14 shows a swimlane for authentication based on data in accordance with one or more embodiments.

FIG. 14 shows a swimlane diagram in which multi-factor authentication is done automatically without the user's manual involvement or work. Instead, the user merely performs a single manual activity of entering their password. Similar to FIG. 13, the swimlane in FIG. 14 includes a first side including a client (e.g., laptop) 1410. A second side, opposite the first side, includes an access control server 1425. In a specific embodiment, the access control server is associated with a backup storage system handling backups of the client. The backup storage system may be on premise. An example of an on premise backup storage system is Data Domain as provided by Dell EMC of Hopkinton, Mass. Instead or additionally, backup storage may be provided by a cloud storage provider such as Amazon Web Services Simple Storage Service (AWS S3) as provided by Amazon of Seattle, Wash.

In a first flow 1430, there is an access request from the client to the access control server. In a second flow 1435, the access control server responds with a prompt for a user 1415 to input their password. In a third flow 1440, the user inputs their password. In a fourth flow 1445, the access control server issues to the client a request for data factor authentication (DFA). Upon receipt of the DFA request, a similarity tree generator of the client is triggered. The tree generator generates a first similarity tree based on a first set of files stored at the client.

As discussed, generating the similarity tree includes hashing the set of files, allocating the files across the similarity tree according to their hash values, and calculating leaf and node index values for the nodes and leaves of the tree. In a fourth flow 1455, the client similarity tree is transmitted from the client to the authentication control server. The fourth flow is shown in broken lines and without a dark fill pattern to indicate that the process of generating and sending the similarity tree is automatic, i.e., without user intervention.

The authentication control server generates a second similarity tree based on a second set of files stored at backup storage that are (presumably) backups of the set of files stored at the client. The authentication control server compares the two similarity trees to calculate a similarity index (e.g., percentage of files that are the same). If the similarity index is above pre-defined threshold level (and other user inputted credentials, e.g., password, is valid), access is granted (fifth flow 1460). If the similarity index is below the pre-defined threshold, access is denied or blocked.

In a specific embodiment, systems and techniques accelerate the service authentication to access backed-up files, in an efficient manner with minimal manual user work and while maintaining multi-factor authentication, without compromising the security. In this specific embodiment, there is an assumption that if a request is initiated to access backup copies of a specific client machine, and the requesting machine has most of the files that are in the backup already ("Similarity Index" is above X %), the requestor has passed this authentication challenge. Combining this with a second authentication (such as a password) enables access to the backup copies for recovery of specific items.

It is important to note that statistically, most requests to access backed up files are to retrieve a single (or few) files (versus complete disaster). Embodiments can help simplify access in those situations, where most of the files in the system are still intact and only one (or few) needs to be recovered. The threshold X will be defined by the user (e.g., administrator user), according to the security policies of the organization. In a case of a recovery from a disaster, where most or all of the machine has been erased, a different authentication method may be required to complement the password authentication. This could be a second "admin" password, or an "admin" SecureID access.

In this specific embodiment, systems and techniques provide a mechanism that enables 2-factor authentication using data-based authentication to continue and verify the user and his required access, with information that is already stored in his computer. In addition to the password, the user's machine is checked to determine if it already has significantly similar data as in the backup, and then it is allowed to access the backup copies for retrieving specific items/files. Unlike existing methods, where hacker can also gain control of the 2FA (if such exist) device and retrieve the additional token, here the attacker, without the password and a significant amount of the data, would get no access.

Stealing credentials is very common these days. Hackers have been able to retrieve credentials via different large-scale campaigns utilizing social engineering and phishing. In such a campaign the attacker would gain the password or can use a brute force attack to retain access to the backup copies and other sensitive data, whether they are stored in the cloud or not. One of the popular ways to mitigate this is by introducing 2FA, to add another authentication method for the user (see, e.g., FIG. 13 and accompanying discussion). This technique has its limitations, including added cost, creates an interference and degrades the user experience as the user may be repeatedly asked for the additional token.

In a specific embodiment, a method is provided that accurately identifies the machine, with the requirement to authenticate, and achieves higher efficiency, additional security and increased trust in the organization. Systems and techniques are provided to efficiently calculate a "similarity index" between two systems that contain many files. In this specific embodiment, an algorithm: 1) Compares between two sets of files efficiently, with minimal data transfer and time. 2) Excludes unwanted files from the comparison. For example: OS files (e.g. Windows) and application files (e.g., Office or Acrobat program files) should not be included in the comparison, since they do not indicate specific user knowledge/security as they are common across many client machines and could bias the comparison result towards a "false positive" authentication. 3) Reacts efficiently to changes in the file system, e.g., when a file is moved from one folder to another, or when it is added or deleted.

In this specific embodiment, the client device and the backup storage (on-premises or cloud) each builds a similarity tree for the backup copy of the machine, based on the data they have in their side. Only the files that are defined by the user (i.e., those not excluded as explained above) are included in the tree. It is noted that all the files that are included must also be included in the backup policy, otherwise they will not exist in the backup side and will not be included in its tree. In other words, as part of an initial configuration for backing up a client to a backup storage, a user at the client may be prompted to select a source folder at the client to backup. Generally, the source folder will be the location at which user generated data, e.g., user generated files and folders, are to be stored. The source folder or, more particularly, the files within the source folder form the basis on which a similarity tree is created to facilitate authentication during later attempts to access backups of the files from backup storage.

FIG. 3 and the discussion accompanying FIG. 3 described a process for generating similarity trees and calculating a similarity index. As discussed, for each file, a hash is calculated using a competent hash function (such as SHA-1 or similar). The result would be a string of hexadecimal digits. The hash tree or similarity tree is built as outlined below:

1) The tree includes N levels. In most cases, for normal client systems, N=2 would be acceptable. For purposes of explanation, embodiments describe a 2-level tree. However, N can be increased if needed to accommodate larger file systems.

2) At each level, the tree has 16 branches stemming from each node. These branches are denoted by a hexadecimal digit: 0-F.

3) Therefore, the 256 leaves at the end of the second level are denoted by the hexadecimal numbers: 00FF.

4) Each leaf is a pointer to a list of entries that includes hashes of files.

5) The files are allocated to each of the 256 lists based on the first two hexadecimal digits of their hash. With the randomness of the hash function, the lists should be on average similar in size.

6) Each leaf carries a value that is the XOR of all the file hashes in its list.

7) Each node will carry a value that is the XOR of all the leaves or downstream nodes connected to it.

Whenever a file is added or deleted, it is added/removed to the appropriate list and the value of the leaf and upstream nodes is updated by XOR function with the file hash.

In a specific embodiment, the "similarity index" between two trees is defined by the percentage of leaves that are the same between those two trees. For example, if out of the 256 leaves, 230 are the same in both trees and 26 are different, then the similarity index is considered 230/256=89.8%.

During operation, when an end-point (e.g., client) wishes to retrieve data from the server, it will provide the similarity tree of its current files to the server, which will compare it to the similarity tree of a latest file backup it has from that machine. If the similarity index between those sets of files is higher than the pre-defined threshold set by the user/administrator, then the comparison is accepted as one authentication method (factor). If it is lower, this authentication method is not accepted. If successful, another authentication may be required (if MFA is enabled) and the user/machine will be granted access to the data.

Figure 15:
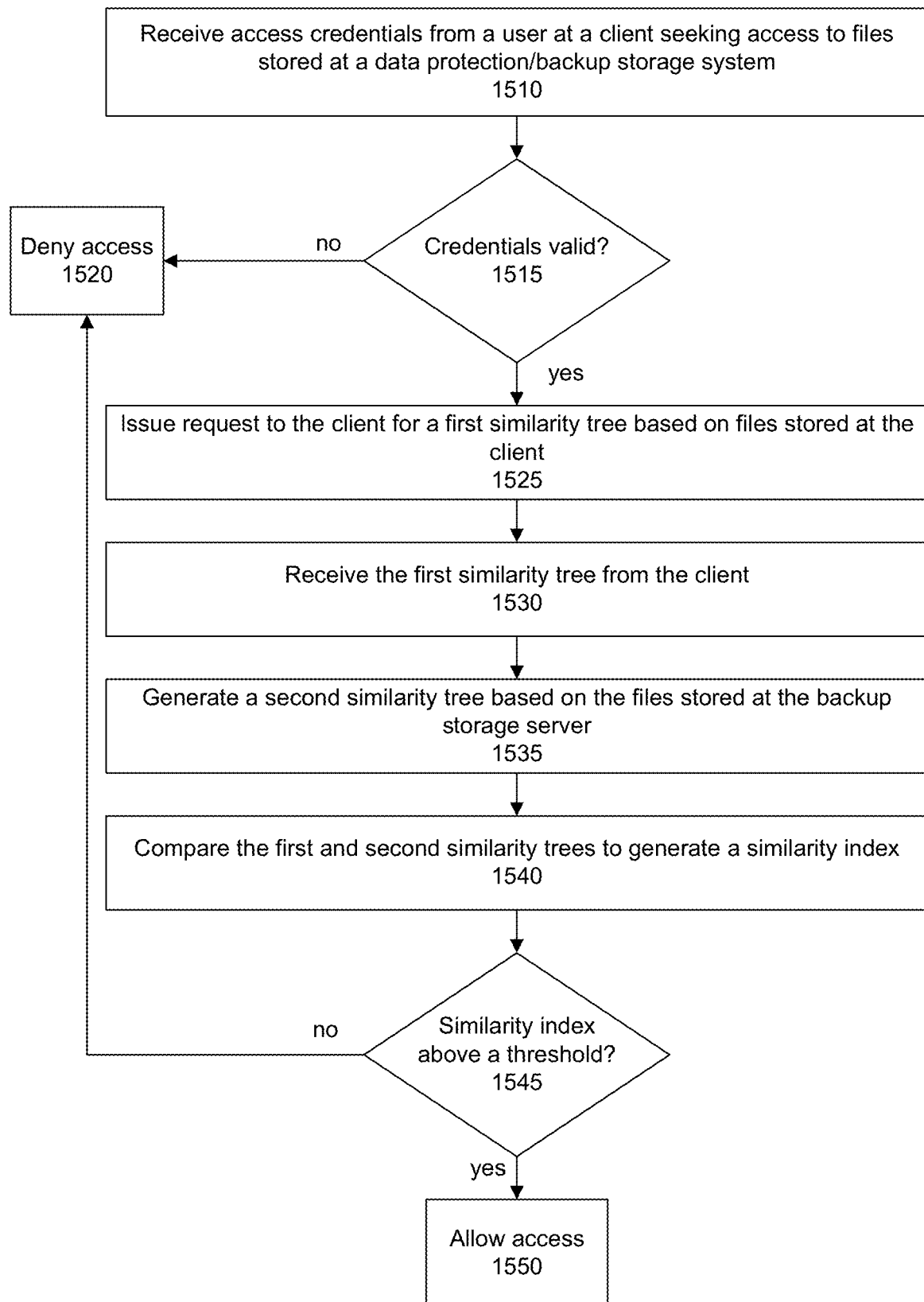
FIG. 15 shows a flow for authentication based on data in accordance with one or more embodiments.

FIG. 15 shows a flow for authentication based on a comparison of data at the client and backup storage server. In a step 1510, access credentials are received from a user at a client seeking access to files stored at a backup storage server, remote from the client. The access credentials may include a username/password. In a step 1515, a determination is made as to whether the credentials are valid. If the credentials are not valid, access is denied (step 1520). If, however, the credentials are valid, in a step 1525, a request is issued to the client for a first similarity tree based on files stored at the client (see, e.g., FIG. 3 steps 310, 315, 320, and 325). The first similarity tree is transmitted over a network connecting the client and backup storage server, and received at the backup storage server (step 1530). Thus, the files stored at the client are not transmitted over the network. Indeed, there can be many hundreds of thousands of files stored at the client. Instead, a lightweight and compact representation of the files is transmitted, i.e., similarity tree.

In a step 1535, a second similarity tree is generated based on the files stored at the backup storage server (see, e.g., FIG. 3 steps 310, 315, 330, and 335). In a step 1540, the first and second similarity trees are compared to assess a degree of similarity between the two trees and, more specifically, calculate a similarity index (see, e.g., FIG. 3 steps 340, 345). In a step 1545, the similarity index is compared to threshold to determine whether the similarity index is above the threshold. If the similarity index is below the threshold, access to the files stored at the backup storage server is denied (step 1520). If, however, the similarity index is above the threshold, access is allowed (step 1550).

As discussed, using a 2-level tree enables a relatively high resolution, which may suffice depending on the rate of change of files. For example, if 10 files have changed, then on average the use of a 2-level tree would detect 10 mismatched leaves. So, the similarity index would be 246/256=96%. If this is accuracy is insufficient, e.g., since there's a lot of change in the files, a 3-level tree should be used.

In a 2-level tree (256 leaves), sending all the leaves in the tree to the other side (e.g., from client to backup server) requires very little resources. For example, if SHA-1 is used as a hash, each hash is 20 bytes, so the leaves would be 256*20=5120 bytes in total, which is a very small amount to transmit across a network.

If, however, larger trees are used, the size may become significant. FIG. 11, for example shows a 3-level tree. In a 3-level tree, the size of all leaves is 82 KB. To save on transmission cost/time, in a specific embodiment, there is a protocol in which at the first or initial query for a tree, only the 256 2nd level nodes values are sent, the server returns a list of those nodes in which a mismatch was detected, and only for them the 3rd-level leaves for those nodes only are sent over. In other words, in this specific embodiment, rather than transmitting an entire tree from the client, across the network, to the server, only a portion of the tree is sent. In this specific embodiment, the portion includes nodes in an intermediate level and excludes entities (e.g., leaves) in a lower level. The nodes in the intermediate level can be compared against corresponding nodes of another tree to identify mismatched nodes and matched nodes. A mismatched node can be a node having an XOR value that does not match an XOR value of a corresponding node. A matched node can be a node having an XOR value that does match an XOR value of a corresponding node.

Once the mismatched nodes have been identified, another request can be issued to the client for the entities (e.g., leaves) downstream from the mismatched nodes. Entities (e.g., leaves) downstream from the matched nodes do not have to be transmitted because a determination will have already been made that these leaves match as a result of the nodes upstream from the leaves matching.

Figure 16:
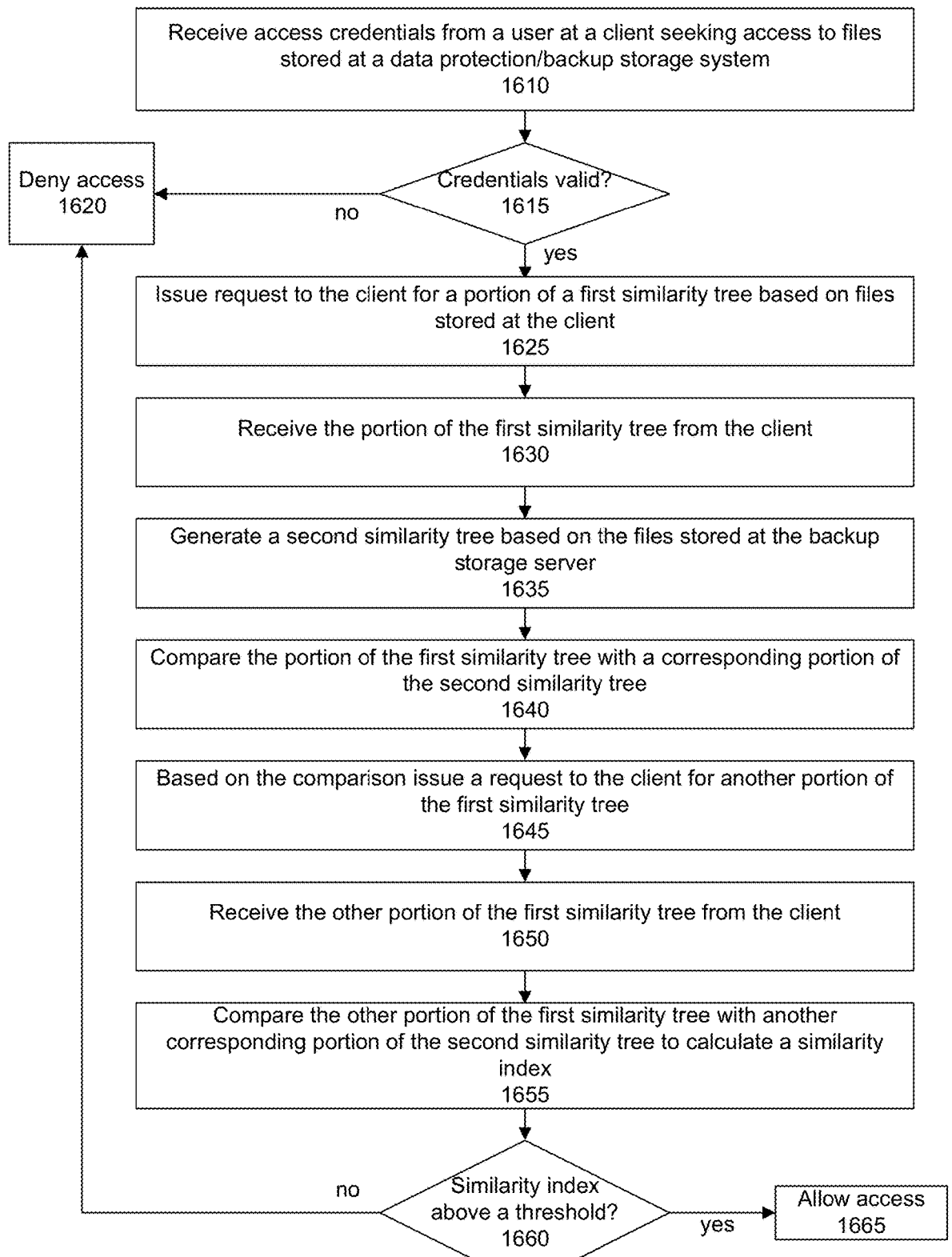
FIG. 16 shows a flow for transmitting a portion of a similarity tree in accordance with one or more embodiments.

FIG. 16 shows an example of a flow in which only portions of a tree are transmitted to help reduce network bandwidth. Steps 1610, 1615, and 1620 are similar to steps 1510, 1515, and 1520 of FIG. 15, respectively. In particular, in a step 1610, access credentials are received from a user at a client seeking access to files stored at backup storage. In a step 1615, a determination is made as to whether the credentials are valid. If not, in a step 1620, access is denied.

Figure 17:
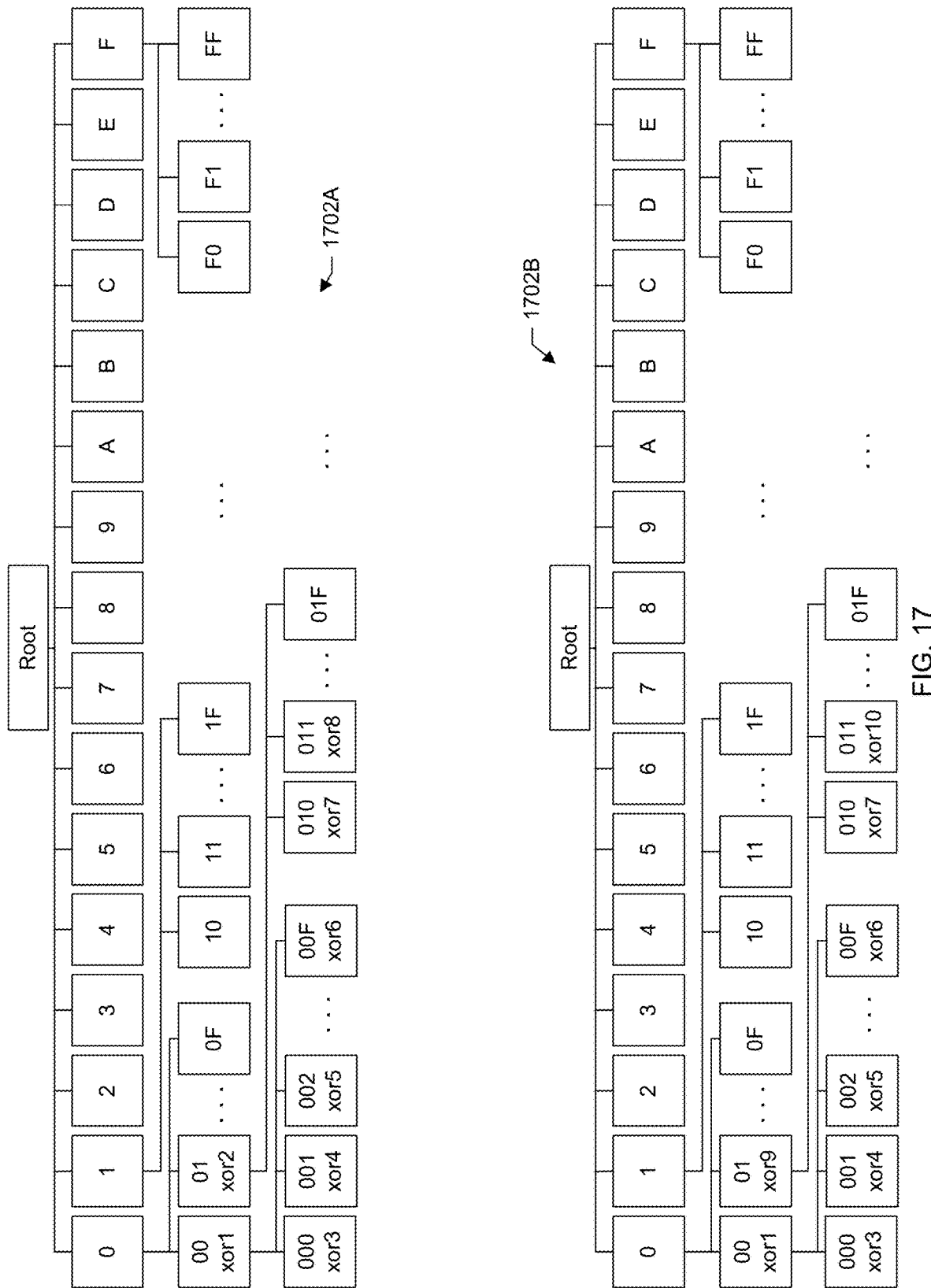
FIG. 17 shows an example of comparing portions of similarity trees in accordance with one or more embodiments.

If, however, the credentials are valid, a request is issued to the client for a portion of a first similarity tree based on files stored at the client. For example, FIG. 17 shows an example of a first tree 1702A having three levels. The three-level tree includes a hierarchical arrangement of entities in an intermediate level and entities in a lowest level. The entities in the intermediate level are identified by hexadecimal values of a first fixed length, e.g., 00-FF. The entities in the lowest level are identified by hexadecimal values of a second fixed length, greater than the first fixed length, e.g., 000-FFF. The entities in the lowest level may be referred to as leaves. The entities in the intermediate level may be referred to as nodes. In this specific embodiment, rather than transmitting the entire tree across the network, only the entities or nodes in the intermediate level are transmitted. The entities or leaves in the lowest level are not transmitted. That is, nodes 00-FF of the first tree may be transmitted across the network, while leaves 000-FFF are not transmitted across the network.

Referring back now to FIG. 16, in a step 1630, the portion of the first similarity tree is received from the client. In a step 1635, a second similarity tree is generated based on the files stored at the backup storage. In a step 1640, the portion of the first similarity tree is compared with a corresponding portion of the second similarity tree. Matching and mismatched nodes are identified.

FIG. 17 shows an example of a second tree 1702B. Nodes 00-FF of the first tree are compared with corresponding nodes 00-FF of the second tree. In this example, node 00 of the first tree has an XOR value of XOR1. Node 01 of the first tree has an XOR value of XOR2. Node 00 of the second tree has an XOR value of XOR1. Node 01 of the second tree has an XOR value of XOR9. Thus, matching nodes include node 00. Mismatched nodes include node 01.

Referring back now to FIG. 16, in a step 1645, based on the comparison, another request is issued to the client for another portion of the first similarity tree. In a specific embodiment, the requested other portion includes leaves downstream from the mismatched nodes and excludes leaves downstream from the matched nodes.

Thus, in the example shown in FIG. 17, the requested other portion includes leaves 010-01F of the first tree which are downstream from (mismatched) node 01. The requested other portion excludes leaves 000-00F of the first tree which are downstream from (matched) node 00.

Referring back now to FIG. 16, in a step 1650, the other portion of the first similarity tree is received from the client. In a step 1655, the other portion of the first similarity tree is compared with another corresponding portion of the second similarity tree to calculate a similarity index. In a step 1660, a determination is made as to whether the similarity index is above a threshold. If not, access is denied (step 1620). If so, access is allowed (step 1665).

In the example shown in FIG. 17, leaf 010 of the first tree has an XOR value of XOR7. Leaf 011 of the first tree has an XOR value of XOR8. Leaf 010 of the second tree has an XOR value of XOR7. Leaf 011 of the second tree has an XOR value of XOR10. Thus, the comparison (step 1655) indicates a leaf 010 is the same between both trees and leaf 011 is different.

Leaves 000-00F of the first tree are the same as corresponding leaves 000-00F of the second tree. However, this determination can be established without having to transmit these leaves over a network to make a direct comparison because it had previously been established that node 00 (which is upstream from leaves 000-00F) of the first tree is the same as corresponding node 00 (which is upstream from leaves 000-00F) of the second tree.

In other words, a node in a first level of a first tree can be compared with a corresponding node in the first level of a second tree. If the nodes are the same (e.g., have the same XOR values), a determination can be made that file hashes downstream from the node of the first tree and file hashes downstream from the node of the second tree are the same. Conducting a higher-level comparison can reduce or eliminate the need to conduct a lower-level comparison. Not having to compare file hashes one-by-one can save a significant amount of time in the overall file set comparison. Thus, in a multi-layer tree, the algorithm provides for an initial comparison of entities in a first level of a first tree with corresponding entities in the first level of a second tree. Entities downstream in a second level, below the first level, do not have to be examined or compared in the initial comparison. Once the initial comparison has been completed, the comparison of the downstream entities can be limited to cases in which a mismatched upstream entity was detected.

In a specific embodiment, a mechanism is provided to accelerate data access without compromising on security, thus preventing a hacker (who may have the user's password) from accessing the storage OS and thereby preventing manipulation or distraction. This mechanism does not require the user to operate a FoB (like SecureID) or a similar manual operation. A unique algorithm is provided to efficiently provide a numerical value for the entire file set (similarity index) for set comparisons and other possible operations.

Referring back now to FIG. 6, the allocation algorithm shown uses the initial two digits of a hash of a file as references to allocate the hash to the appropriate node and ultimately leaf and hash list of the tree. It should be appreciated, however, that digits in other positions of the hash may instead be used so long as the definition of which digits to use is consistent throughout the allocation. For example, in other specific embodiments, an allocation algorithm may use digits in the third and fourth positions of the hash to allocate the files. An allocation algorithm may use digits in the second and fifth positions of the hash to allocate the files. As another example, a 3-layer tree may use digits in the second, fourth, and fifth positions of the hash to allocate the files. Thus, any digit locations may be used as long as they are consistent. It is noted that since the hash function "randomizes" the string, there is no statistical advantage for any location, i.e., any locations chosen should provide a uniform distribution of the hashes across all leaves.

In a specific embodiment, there is a method of authenticating a user at a client to a backup server comprising: receiving, from the client, a request to access one or more files of a set of files stored at the backup server; receiving, for the request, a first tree representing hashes of a set of files stored at the client, the set of files stored at the client; generating a second tree representing hashes of the set of files stored at the backup server; comparing the first tree against the second tree to assess a degree of similarity between the set of files stored at the client and the set of files stored at the backup server; and denying the user access to the set of files stored at the backup server when the degree of similarity is below a threshold.

The method may further include generating each of the first and second tree by: assigning single-digit hexadecimal values to nodes in an upper level of each tree; assigning two-digit hexadecimal values to leaves in a lower level of each tree; obtaining hashes of files in each set of files; allocating each respective set of files across a respective tree by matching first and second digits of the hashes to the nodes having the single-digit hexadecimal values and the leaves having the two-digit hexadecimal values, the leaves comprising pointers to hash lists in which the hashes are stored; and applying, for each leaf of the respective tree, an XOR function to hashes stored in a hash list referenced by a leaf of the respective tree.

The method may further include receiving access credentials from the user at the client seeking to access the one or more files of the set of files stored at the backup server; determining that the access credentials are valid; and after the determination, issuing a request to the client for the first tree. In an embodiment, the degree of similarity indicates a percentage of files between the set of files stored at the client and the set of files stored at the backup server that are the same. The method may include allowing the user access to the set of files stored at the backup server when the degree of similarity is above the threshold and a determination is made that access credentials input by the user at the client are valid. In a specific embodiment, the authenticating comprises not transmitting the set of files stored at the client to the backup server.

In another specific embodiment, there is a system for authenticating a user at a client to a backup server comprising: a processor; and memory configured to store one or more sequences of instructions which, when executed by the processor, cause the processor to carry out the steps of: receiving, from the client, a request to access one or more files of a set of files stored at the backup server; receiving, for the request, a first tree representing hashes of a set of files stored at the client, the set of files stored at the client; generating a second tree representing hashes of the set of files stored at the backup server; comparing the first tree against the second tree to assess a degree of similarity between the set of files stored at the client and the set of files stored at the backup server; and denying the user access to the set of files stored at the backup server when the degree of similarity is below a threshold.

In another specific embodiment, there is a computer program product, comprising a non-transitory computer-readable medium having a computer-readable program code embodied therein, the computer-readable program code adapted to be executed by one or more processors to implement a method of authenticating a user at a client to a backup server, the method comprising: receiving, from the client, a request to access one or more files of a set of files stored at the backup server; receiving, for the request, a first tree representing hashes of a set of files stored at the client, the set of files stored at the client; generating a second tree representing hashes of the set of files stored at the backup server; comparing the first tree against the second tree to assess a degree of similarity between the set of files stored at the client and the set of files stored at the backup server; and denying the user access to the set of files stored at the backup server when the degree of similarity is below a threshold.

In a specific embodiment, there is a method of comparing first files in a first set of files with second files in a second set of files comprising: generating first and second trees comprising leaves identified by hexadecimal values; allocating the first files across leaves of the first tree based on hashes of the first files and the hexadecimal values identifying the leaves of the first tree; translating the hashes for the allocated first files into first leaf index values, each first leaf index value being associated with a respective leaf of the first tree and representing respective files from the first set of files that have been allocated to the respective leaf of the first tree; allocating the second files across leaves of the second tree based on hashes of the second files and the hexadecimal values identifying the leaves of the second tree; translating the hashes for the allocated second files into second leaf index values, each second leaf index value being associated with a respective leaf of the second tree and representing respective files from the second set of files that have been allocated to the respective leaf of the second tree; comparing the first leaf index values associated with leaves of the first tree with the second leaf index values associated with corresponding leaves of the second tree to identify leaves that are the same between the first and second trees; and creating, from the comparison, a similarity index indicating a degree of similarity between the first and second sets of files.

In an embodiment, the allocating the first files further comprises: matching at least a part of the hashes for the first files in the first set of files to the hexadecimal values identifying the leaves of the first tree; and wherein the allocating the second files further comprises: matching at least a part of the hashes for the second files in the second set of files to the hexadecimal values identifying the leaves of the second tree. In an embodiment, the first leaf index values and the second leaf index values comprise a fixed-length. In an embodiment, the similarity index comprises a percentage value of leaves between the first and second trees having the same first and second leaf index values.

In an embodiment, the first and second trees comprise at least an upper level having nodes and a lower level having the leaves branching from the upper level of nodes, the upper level of nodes being identified by a single-digit hexadecimal value, and the lower level of leaves being identified by a two-digit hexadecimal value.

In a specific embodiment, the translating the hashes for the allocated first files into first leaf index values further comprises: applying an XOR function to hashes of files from the first set of files allocated to each respective leaf of the first tree; and wherein the translating the hashes for the allocated second files further comprises: applying the XOR function to hashes of files from the second set of files allocated to each respective leaf of the second tree.

In another specific embodiment, there is a system for comparing first files in a first set of files with second files in a second set of files comprising: a processor; and memory configured to store one or more sequences of instructions which, when executed by the processor, cause the processor to carry out the steps of: generating first and second trees comprising leaves identified by hexadecimal values; allocating the first files across leaves of the first tree based on hashes of the first files and the hexadecimal values identifying the leaves of the first tree; translating the hashes for the allocated first files into first leaf index values, each first leaf index value being associated with a respective leaf of the first tree and representing respective files from the first set of files that have been allocated to the respective leaf of the first tree; allocating the second files across leaves of the second tree based on hashes of the second files and the hexadecimal values identifying the leaves of the second tree; translating the hashes for the allocated second files into second leaf index values, each second leaf index value being associated with a respective leaf of the second tree and representing respective files from the second set of files that have been allocated to the respective leaf of the second tree; comparing the first leaf index values associated with leaves of the first tree with the second leaf index values associated with corresponding leaves of the second tree to identify leaves that are the same between the first and second trees; and creating, from the comparison, a similarity index indicating a degree of similarity between the first and second sets of files.

In another specific embodiment, there is a computer program product, comprising a non-transitory computer-readable medium having a computer-readable program code embodied therein, the computer-readable program code adapted to be executed by one or more processors to implement a method of comparing first files in a first set of files with second files in a second set of files, the method comprising: generating first and second trees comprising leaves identified by hexadecimal values; allocating the first files across leaves of the first tree based on hashes of the first files and the hexadecimal values identifying the leaves of the first tree; translating the hashes for the allocated first files into first leaf index values, each first leaf index value being associated with a respective leaf of the first tree and representing respective files from the first set of files that have been allocated to the respective leaf of the first tree; allocating the second files across leaves of the second tree based on hashes of the second files and the hexadecimal values identifying the leaves of the second tree; translating the hashes for the allocated second files into second leaf index values, each second leaf index value being associated with a respective leaf of the second tree and representing respective files from the second set of files that have been allocated to the respective leaf of the second tree; comparing the first leaf index values associated with leaves of the first tree with the second leaf index values associated with corresponding leaves of the second tree to identify leaves that are the same between the first and second trees; and creating, from the comparison, a similarity index indicating a degree of similarity between the first and second sets of files.

In another specific embodiment, there is a method of comparing first and second sets of files comprising: generating a first tree for the first set of files; generating a second tree for the second set of files, each first and second tree comprising at least an upper level of nodes and a lower level of leaves branching from the upper level of nodes; identifying each node in the upper level with a single hexadecimal digit; identifying each leaf in the lower level with a two-digit hexadecimal value; obtaining a first plurality of hashes corresponding to files in the first set of files; allocating the first plurality of hashes to leaves of the first tree by matching hexadecimal digits in first and second positions of hashes from the first plurality of hashes to the two-digit hexadecimal values identifying leaves of the first tree; for each leaf of the first tree having one or more allocated hashes, generating an XOR value using the one or more hashes allocated to a leaf of the first tree; associating the XOR value to its respective leaf of the first tree; obtaining a second plurality of hashes corresponding to files in the second set of files; allocating the second plurality of hashes to leaves of the second tree by matching hexadecimal digits in the first and second positions of hashes from the second plurality of hashes to the two-digit hexadecimal values identifying leaves of the second tree; for each leaf of the second tree having one or more allocated hashes, generating an XOR value using the one or more hashes allocated to a leaf of the second tree; associating the XOR value to its respective leaf of the second tree; comparing XOR values associated with leaves of the first tree with XOR values associated with corresponding leaves of the second tree to identify leaves that are the same between the first and second trees; and generating from the comparison an indication of a degree of similarity between the first and second sets of files.

In another specific embodiment, there is a method of authenticating a user at a client to a backup server comprising: receiving, at the backup server from the client, a request to access one or more files of a set of files stored at the backup server; receiving, in conjunction with the request, a first tree representing hashes of a set of files stored at the client, the set of files stored at the client comprising user-generated data; generating, at the backup server, a second tree representing hashes of the set of files stored at the backup server; comparing the first tree against the second tree to assess a degree of similarity between the set of files stored at the client and the set of files stored at the backup server; and denying the user access to the set of files stored at the backup server when the degree of similarity is below a threshold.

Figure 18:
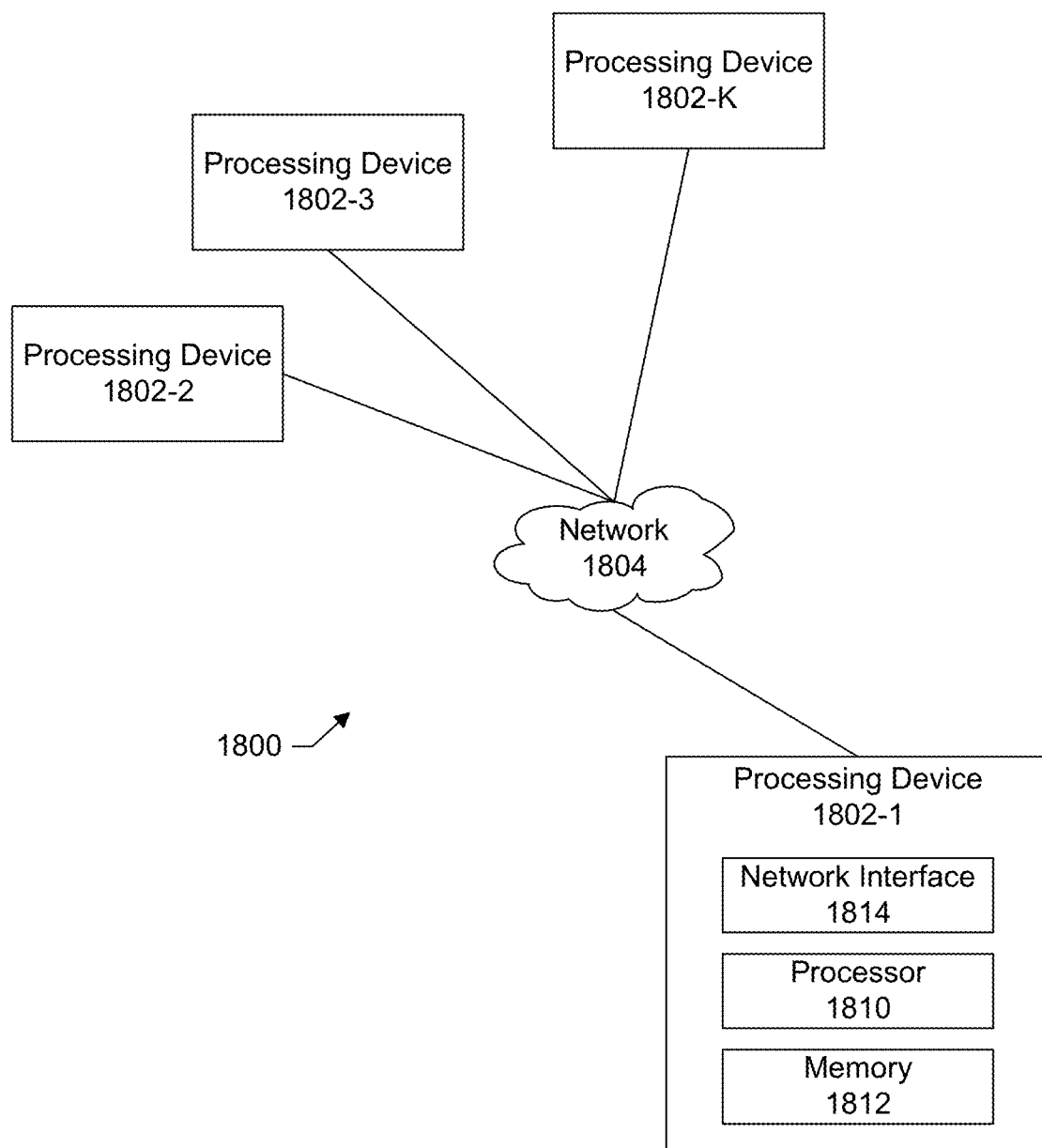
FIG. 18 shows a block diagram of a processing platform that may be utilized to implement at least a portion of an information processing system, according to one or more embodiments.

FIG. 18 shows an example of a processing platform 1800. The processing platform 1800 in this embodiment comprises a portion of system 200 and includes a plurality of processing devices, denoted 1802-1, 1802-2, 1802-3, . . . 1802-K, which communicate with one another over a network 1804.

The network 1804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1802-1 in the processing platform 1800 comprises a processor 1810 coupled to a memory 1812.

The processor 1810 may comprise a microprocessor, a microcontroller, an application-specific integrated circuit (ASIC), a field-programmable gate array (FPGA) or other type of processing circuitry, as well as portions or combinations of such circuitry elements.

The memory 1812 may comprise random access memory (RAM), read-only memory (ROM) or other types of memory, in any combination. The memory 1812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1802-1 is network interface circuitry 1814, which is used to interface the processing device with the network 1804 and other system components, and may comprise conventional transceivers.

The other processing devices 1802 of the processing platform 1800 are assumed to be configured in a manner similar to that shown for processing device 1802-1 in the figure.

Again, the particular processing platform 1800 shown in the figure is presented by way of example only, and system 200 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 105 are illustratively implemented in the form of software running on one or more processing devices.

Figure 19:
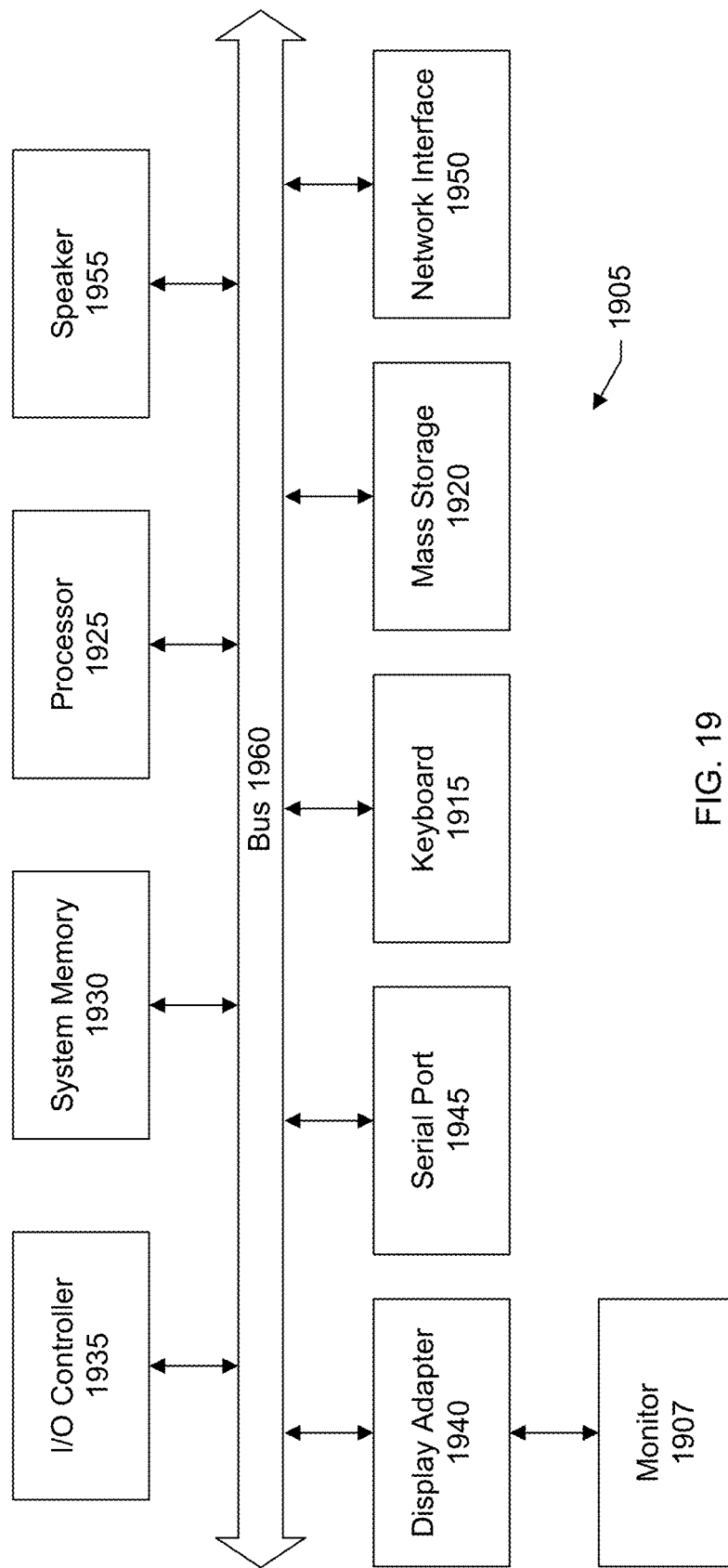
FIG. 19 shows a block diagram of a computer system suitable for use with the information processing system, according to one or more embodiments.

FIG. 19 shows a system block diagram of a computer system 1905 used to execute the software of the present system described herein. The computer system includes a monitor 1907, keyboard 1915, and mass storage devices 1920. Computer system 1905 further includes subsystems such as central processor 1925, system memory 1930, input/output (I/O) controller 1935, display adapter 1940, serial or universal serial bus (USB) port 1945, network interface 1950, and speaker 1955. The system may also be used with computer systems with additional or fewer subsystems. For example, a computer system could include more than one processor 1925 (i.e., a multiprocessor system) or a system may include a cache memory.

Arrows such as 1960 represent the system bus architecture of computer system 1905. However, these arrows are illustrative of any interconnection scheme serving to link the subsystems. For example, speaker 1955 could be connected to the other subsystems through a port or have an internal direct connection to central processor 1925. The processor may include multiple processors or a multicore processor, which may permit parallel processing of information. Computer system 1905 shown in FIG. 19 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X®, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A method of comparing first files in a first set of files with second files in a second set of files comprising:
generating first and second trees comprising leaves identified by hexadecimal values;
allocating the first files across leaves of the first tree based on hashes of the first files and the hexadecimal values identifying the leaves of the first tree;
translating the hashes for the allocated first files into first leaf index values, each first leaf index value being associated with a respective leaf of the first tree and representing respective files from the first set of files that have been allocated to the respective leaf of the first tree;
allocating the second files across leaves of the second tree based on hashes of the second files and the hexadecimal values identifying the leaves of the second tree;
translating the hashes for the allocated second files into second leaf index values, each second leaf index value being associated with a respective leaf of the second tree and representing respective files from the second set of files that have been allocated to the respective leaf of the second tree;
comparing the first leaf index values associated with leaves of the first tree with the second leaf index values associated with corresponding leaves of the second tree to identify leaves that are the same between the first and second trees; and
creating, from the comparison, a similarity index indicating a degree of similarity between the first and second sets of files.

2. The method of claim 1 wherein the allocating the first files further comprises:
matching at least a part of the hashes for the first files in the first set of files to the hexadecimal values identifying the leaves of the first tree; and
wherein the allocating the second files further comprises:
matching at least a part of the hashes for the second files in the second set of files to the hexadecimal values identifying the leaves of the second tree.

3. The method of claim 1 wherein the first leaf index values and the second leaf index values comprise a fixed-length.

4. The method of claim 1 wherein the similarity index comprises a percentage value of leaves between the first and second trees having the same first and second leaf index values.

5. The method of claim 1 wherein the first and second trees comprise at least an upper level having nodes and a lower level having the leaves branching from the upper level of nodes, the upper level of nodes being identified by a single-digit hexadecimal value, and the lower level of leaves being identified by a two-digit hexadecimal value.

6. The method of claim 1 wherein the translating the hashes for the allocated first files into first leaf index values further comprises:
applying an XOR function to hashes of files from the first set of files allocated to each respective leaf of the first tree; and
wherein the translating the hashes for the allocated second files further comprises:
applying the XOR function to hashes of files from the second set of files allocated to each respective leaf of the second tree.

7. A system for comparing first files in a first set of files with second files in a second set of files comprising: a processor; and memory configured to store one or more sequences of instructions which, when executed by the processor, cause the processor to carry out the steps of:
generating first and second trees comprising leaves identified by hexadecimal values;

allocating the first files across leaves of the first tree based on hashes of the first files and the hexadecimal values identifying the leaves of the first tree;

translating the hashes for the allocated first files into first leaf index values, each first leaf index value being associated with a respective leaf of the first tree and representing respective files from the first set of files that have been allocated to the respective leaf of the first tree;

allocating the second files across leaves of the second tree based on hashes of the second files and the hexadecimal values identifying the leaves of the second tree;

translating the hashes for the allocated second files into second leaf index values, each second leaf index value being associated with a respective leaf of the second tree and representing respective files from the second set of files that have been allocated to the respective leaf of the second tree;

comparing the first leaf index values associated with leaves of the first tree with the second leaf index values associated with corresponding leaves of the second tree to identify leaves that are the same between the first and second trees; and creating, from the comparison, a similarity index indicating a degree of similarity between the first and second sets of files.

8. The system of claim 7 wherein the allocating the first files further comprises:
matching at least a part of the hashes for the first files in the first set of files to the hexadecimal values identifying the leaves of the first tree; and
wherein the allocating the second files further comprises:
matching at least a part of the hashes for the second files in the second set of files to the hexadecimal values identifying the leaves of the second tree.

9. The system of claim 7 wherein the first leaf index values and the second leaf index values comprise a fixed-length.

10. The system of claim 7 wherein the similarity index comprises a percentage value of leaves between the first and second trees having the same first and second leaf index values.

11. The system of claim 7 wherein the first and second trees comprise at least an upper level having nodes and a lower level having the leaves branching from the upper level of nodes, the upper level of nodes being identified by a single-digit hexadecimal value, and the lower level of leaves being identified by a two-digit hexadecimal value.

12. The system of claim 7 wherein the translating the hashes for the allocated first files into first leaf index values further comprises:
applying an XOR function to hashes of files from the first set of files allocated to each respective leaf of the first tree; and
wherein the translating the hashes for the allocated second files further comprises:
applying the XOR function to hashes of files from the second set of files allocated to each respective leaf of the second tree.

13. A computer program product, comprising a non-transitory computer-readable medium having a computer-readable program code embodied therein, the computer-readable program code adapted to be executed by one or more processors to implement a method of comparing first files in a first set of files with second files in a second set of files, the method comprising:

generating first and second trees comprising leaves identified by hexadecimal values;

allocating the first files across leaves of the first tree based on hashes of the first files and the hexadecimal values identifying the leaves of the first tree;

translating the hashes for the allocated first files into first leaf index values, each first leaf index value being associated with a respective leaf of the first tree and representing respective files from the first set of files that have been allocated to the respective leaf of the first tree;

allocating the second files across leaves of the second tree based on hashes of the second files and the hexadecimal values identifying the leaves of the second tree;

translating the hashes for the allocated second files into second leaf index values, each second leaf index value being associated with a respective leaf of the second tree and representing respective files from the second set of files that have been allocated to the respective leaf of the second tree;

comparing the first leaf index values associated with leaves of the first tree with the second leaf index values associated with corresponding leaves of the second tree to identify leaves that are the same between the first and second trees; and creating, from the comparison, a similarity index indicating a degree of similarity between the first and second sets of files.

14. The computer program product of claim 13 wherein the allocating the first files further comprises:
matching at least a part of the hashes for the first files in the first set of files to the hexadecimal values identifying the leaves of the first tree; and
wherein the allocating the second files further comprises:
matching at least a part of the hashes for the second files in the second set of files to the hexadecimal values identifying the leaves of the second tree.

15. The computer program product of claim 13 wherein the first leaf index values and the second leaf index values comprise a fixed-length.

16. The computer program product of claim 13 wherein the similarity index comprises a percentage value of leaves between the first and second trees having the same first and second leaf index values.

17. The computer program product of claim 13 wherein the first and second trees comprise at least an upper level having nodes and a lower level having the leaves branching from the upper level of nodes, the upper level of nodes being identified by a single-digit hexadecimal value, and the lower level of leaves being identified by a two-digit hexadecimal value.

18. The computer program product of claim 13 wherein the translating the hashes for the allocated first files into first leaf index values further comprises:
applying an XOR function to hashes of files from the first set of files allocated to each respective leaf of the first tree; and
wherein the translating the hashes for the allocated second files further comprises:
applying the XOR function to hashes of files from the second set of files allocated to each respective leaf of the second tree.

* * * * *